(12) United States Patent
Netravali et al.

(10) Patent No.: US 11,963,605 B2
(45) Date of Patent: *Apr. 23, 2024

(54) GREEN TECHNOLOGY FOR CROSSLINKING PROTEIN MOLECULES FOR VARIOUS USES

(71) Applicant: CORNELL UNIVERSITY, Ithaca, NY (US)

(72) Inventors: Anil N. Netravali, Ithaca, NY (US); Yidong Zhong, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 17/334,673

(22) Filed: May 28, 2021

(65) Prior Publication Data

US 2021/0289906 A1    Sep. 23, 2021

Related U.S. Application Data

(63) Continuation of application No. 15/307,828, filed as application No. PCT/US2015/028959 on May 1, 2015, now Pat. No. 11,019,902.

(Continued)

(51) Int. Cl.
*A61K 9/00*      (2006.01)
*A45D 2/00*    (2006.01)
(Continued)

(52) U.S. Cl.
CPC ............... *A45D 7/06* (2013.01); *A45D 2/001* (2013.01); *C08H 1/02* (2013.01); *C08H 1/06* (2013.01);
(Continued)

(58) Field of Classification Search
CPC ...................................................... A45D 7/06
See application file for complete search history.

(56) References Cited

U.S. PATENT DOCUMENTS

| 3,051,544 | A | 8/1962 | Wolf et al. |
| 4,272,470 | A | 6/1981 | Hsu et al. |

(Continued)

FOREIGN PATENT DOCUMENTS

| CN | 101544705 B | 9/2009 |
| KR | 1020130060594 A | 6/2013 |

(Continued)

OTHER PUBLICATIONS

US 8,679,466 B2, 03/2014, Paul et al. (withdrawn)

(Continued)

*Primary Examiner* — Paul W Dickinson
(74) *Attorney, Agent, or Firm* — FisherBroyles, LLP; Andrew K. Gonsalves

(57) ABSTRACT

The present disclosure relates to, inter alia, a green technology for crosslinking protein molecules for various uses, where the protein molecules can be contained in protein fibers such as, but not limited to, human hair, animal fibers, and mixtures thereof. In one aspect, the present disclosure relates to a crosslinking agent comprising an oxidized sugar having at least two aldehyde groups. In another aspect, the present disclosure relates to a method of crosslinking protein fibers. This method involves providing the aforementioned crosslinking agent and infiltrating a plurality of non-crosslinked protein fibers with the crosslinking agent under conditions effective to cause protein molecules contained in the non-crosslinked protein fibers to become crosslinked, thereby yielding a population of crosslinked protein fibers.

20 Claims, 17 Drawing Sheets

Related U.S. Application Data

(60) Provisional application No. 61/987,328, filed on May 1, 2014.

(51) Int. Cl.
  *A45D 7/06* (2006.01)
  *C08H 1/02* (2006.01)
  *C08H 1/06* (2006.01)
  *D06M 10/08* (2006.01)
  *D06M 13/165* (2006.01)

(52) U.S. Cl.
  CPC .......... *D06M 10/08* (2013.01); *D06M 13/165* (2013.01)

(56) References Cited

U.S. PATENT DOCUMENTS

| | | |
|---|---|---|
| 5,308,641 A | 5/1994 | Cahalan et al. |
| 5,972,385 A | 10/1999 | Liu |
| 7,988,954 B2 | 8/2011 | Chandra et al. |
| 8,182,798 B2 | 5/2012 | Paul |
| 8,187,582 B2 | 5/2012 | Pye et al. |
| 8,192,728 B2 | 6/2012 | Paul |
| 8,273,335 B2 | 9/2012 | Pye et al. |
| 8,580,237 B2 | 11/2013 | Paul |
| 2001/0034315 A1 | 10/2001 | Grainger et al. |
| 2003/0029588 A1 | 2/2003 | Cui et al. |
| 2004/0023836 A1 | 2/2004 | Moorfield et al. |
| 2006/0276370 A1 | 12/2006 | Zhang et al. |
| 2010/0135946 A1 | 6/2010 | Paul |
| 2010/0172855 A1 | 7/2010 | Paul |
| 2010/0196303 A1 | 8/2010 | Paul |
| 2011/0044925 A1 | 2/2011 | Pye et al. |
| 2011/0120489 A1 | 5/2011 | Pye et al. |
| 2012/0034180 A1 | 2/2012 | Paul et al. |
| 2012/0093755 A1 | 4/2012 | Humphreys et al. |
| 2013/0071344 A1 | 3/2013 | Amin et al. |
| 2013/0084260 A1 | 4/2013 | Amin et al. |
| 2013/0142749 A1 | 6/2013 | Paul et al. |
| 2013/0344006 A1 | 12/2013 | Akinpelu et al. |
| 2013/0344017 A1 | 12/2013 | Chandra et al. |
| 2013/0344020 A1 | 12/2013 | Akinpelu et al. |

FOREIGN PATENT DOCUMENTS

| | | |
|---|---|---|
| WO | 2001031112 A2 | 5/2001 |
| WO | 2006090119 A1 | 8/2006 |
| WO | 2008012732 A2 | 1/2008 |
| WO | 2008110399 A1 | 9/2008 |
| WO | 2009118253 A2 | 10/2009 |
| WO | 2012107367 A1 | 8/2012 |
| WO | 2013064597 A2 | 5/2013 |
| WO | 2013076061 A2 | 5/2013 |
| WO | 2014089578 A1 | 6/2014 |
| WO | 2014135433 A2 | 9/2014 |
| WO | 2015054018 A1 | 4/2015 |
| WO | 2015094757 A1 | 6/2015 |
| WO | 2015094760 A1 | 6/2015 |
| WO | 2015094787 A1 | 6/2015 |
| WO | 2015094838 A1 | 6/2015 |

OTHER PUBLICATIONS

Stevens, Chemical Modiciation of Inulin, a Valuable Renewable Resource, and Its Industrial Applications (Year: 2001).*
International Searching Authority, International Search Report and Written Opinion issued in counterpart International Application No. PCT/US2015/028959, dated Sep. 1, 2015.
European Patent Office, European Search Report issued in counterpart European Patent Application No. EP 15785561 dated Jan. 2, 2018.
Herrmann, K.W., "Hair Keratin Reaction, Penetration, and Swelling in Mercaptan Solutions," Transactions of the Faraday Society, 59:1663-1671 (1963).
Wong et al., "Mechanism of Hair Straightening," J. Soc. Cosmet. Chem., 45:347-352 (1994).
Velasco et al., "Hair Fiber Characteristics and Methods to Evaluate Hair Physical and Mechanical Properties," Brazilian J. Pharm. Sci., 45(1):153-162 (2009).
Dastidar et al., "A Soy Flour Based Thermoset Resin without the Use of Any External Crosslinker," Green Chem., 15:3243-3251 (2013).
Inoue et al., "Structural Analysis of Human Hair in Aqueous Solutions Using Microbeam X-ray Diffraction," Research Frontiers, Spring 8, pp. 46-47 (2007).
Moss et al., Glossary of Class Names of Organic Compounds and Reactive Intermediates Based on Structure (IUPAC Recommendations 1995), Pure & Appl. Chem., 67(8/9):1307-1375 (1995).
https://www.britannica.com/science/oligosaccharide, Mar. 28, 2020.
https://www.ncbi.nlm.nih.gov/books/NBK453086/?report=printable, Mar. 28, 2020.

* cited by examiner

Sucrose → Oxidized sucrose

Oxidation of sucrose

Crosslinking of hair using oxidized sucrose

R = $Na^+$; $Ka^+$; $Ca^{2+}$; $Mg^{2+}$; $NH_4^+$; $Li^+$;
X = $OH^-$; $CO_3^{2-}$; $HCO_3^-$; $CH_3O^-$; $CH_3CH_2O^-$; $(CH_3)_3CO^-$

GREEN TECHNOLOGY FOR CROSSLINKING PROTEIN MOLECULES FOR VARIOUS USES

CROSS-REFERENCE TO RELATED APPLICATIONS

This application is a continuation of U.S. patent application Ser. No. 15/307,828, filed Oct. 30, 2016, which issued as U.S. Pat. No. 11,019,902 on Jun. 1, 2021, which is a U.S. National Phase filing under 35 U.S.C. § 371 of International Application No. PCT/US2015/028959, filed May 1, 2015, and published as WO 2015/168662 A1 on Nov. 5, 2015, which claims priority benefit of U.S. Provisional Patent Application Ser. No. 61/987,328, filed May 1, 2014, the disclosures of which are hereby incorporated by reference herein in their entirety.

FIELD OF THE INVENTION

The present disclosure relates to, inter alia, a green technology for crosslinking protein molecules for various uses, where the protein molecules can be contained in protein fibers such as, but not limited to, human hair, animal fibers, and mixtures thereof.

BACKGROUND OF THE INVENTION

Treating human hair for cosmetic purposes and treating animal fibers to produce useful consumer products often involve harsh chemical-based and/or environmentally damaging processes. Regarding the treatment of human hair, changing the state of the hair from curly and kinky to straight or from straight to curly is one of the most common hair treatments for all human beings, particularly for the women. There are many ways to obtain the desired state of hair (e.g., straight, curly, kinky, etc.). For example, using a flat-iron for hair straightening and using rolls and curling irons for obtaining hair curls are two the most common methods practiced. However, both of these treatments are temporary and must use higher temperatures for obtaining the best results. Further, when the hair is washed, the straightness or curliness can be easily lost. Undesired loss of straightness or curliness may also occur when the hair is exposed to humid environment.

For a more permanent treatment of hair or animal fibers/fabrics, the use of chemicals, particularly harsh chemicals, is common. For example, in a typical process for a lasting treatment of hair, the hair is saturated with a solution containing a chemical compound that breaks the bonds that give each strand its shape. Thereafter, the hair is then rinsed, blow-dried, and meticulously flat-ironed to reach the desired shape. Once a 'neutralizer' is applied, the hair is locked into this new, straight configuration. The process can take up to eight hours the first time (depending on length and thickness), while touch-ups require three to four hours. Generally, for a short period after the treatment (e.g., three days), the treated hair should not be wetted or manipulated in such a way that would induce kink (e.g., like wearing a ponytail). While the hair will now be sleek and shiny (even after air-drying), bone-straight may be the only styling option. Even curling irons or hot rollers will not restore the volume or wave. Therefore, there is a need for more permanent solutions to hair treatment processes that are also not dependent on harsh chemical or high temperatures that could harm the hair.

With regard to producing fabrics based on animal fibers, there is a deficiency in the art of environmentally friendly methods in maintaining the fabrics in a particular form (e.g., pleated, wrinkle-free, creased, flattened).

The present invention is directed to overcoming these and other deficiencies in the art.

SUMMARY OF THE INVENTION

In various aspects, the present invention relates to, inter alia, green technology for crosslinking protein fibers, including, without limitation, fibers such as woolen, hair, and other protein fibers for various uses. In one embodiment, the present invention relates to a green technology for crosslinking of hair (including human hair or non-human hair), and other protein fibers, to obtain stiffness, long lasting straightness, curliness or frizz, or other desired three dimensional structures. In another embodiment, the present invention relates to a green technology for crosslinking of woolen and other protein fiber based fabrics to increase their crease retention and stiffness.

In one aspect, the present disclosure provides a method of crosslinking protein fibers. The method involves: (i) providing a crosslinking agent comprising an oxidized sugar having at least two aldehyde groups; and (ii) infiltrating a plurality of non-crosslinked protein fibers with the crosslinking agent under conditions effective to cause protein molecules contained in the non-crosslinked protein fibers to become crosslinked, thereby yielding a population of crosslinked protein fibers. The protein molecules of the non-crosslinked protein fibers comprise amine groups that react with the aldehyde groups of the oxidized sugar to achieve the crosslinking of the protein molecules to yield the crosslinked protein fibers.

In another aspect, the present disclosure provides a formulation for crosslinking protein fibers. The formulation includes a crosslinking agent comprising a plurality of oxidized sugars having at least two aldehyde groups, where the crosslinking agent is formulated so that the aldehyde groups of the oxidized sugars are effective to react with amine groups of protein molecules contained in the non-crosslinked protein fibers to yield a population of crosslinked protein fibers.

In a further aspect, the present disclosure provides a method of treating human hair to maintain a desired three dimensional structure. This method involves: (i) providing a formulation as described herein; and (ii) treating a population of human hair with the formulation so as to maintain the desired three dimensional (3D) structure of the population of human hair, where the human hair comprises non-crosslinked protein fibers having protein molecules having amine groups that react with the aldehyde groups of the oxidized sugar of the formulation.

In another aspect, the present disclosure provides a method of treating animal fibers to maintain a desired three dimensional structure. This method involves: (i) providing a formulation as described herein; and (ii) treating a population of animal fibers with the formulation so as maintain the desired three dimensional (3D) structure of the population of the animal fiber, where the animal fiber comprises non-crosslinked protein fibers having protein molecules having amine groups that react with the aldehyde groups of the oxidized sugar of the formulation.

In another aspect, the present disclosure provides a fabric comprising the treated animal fibers produced according to the corresponding method as described herein.

In a further aspect, the present disclosure provides a method of making a formulation for crosslinking protein fibers. This method involves: (i) providing a mixture of non-oxidized sugar molecules; and (ii) reacting the non-oxidized sugar molecules with a benign oxidizing agent to cause oxidation of the non-oxidized sugar molecules to yield a formulation comprising a mixture of oxidized sugar molecules having at least two aldehyde groups, where the mixture of oxidized sugar molecules are crosslinking agents effective to react with amine groups of protein molecules contained in non-crosslinked protein fibers to yield a population of crosslinked protein fibers.

In another aspect, the present disclosure provides a formulation produced according to the corresponding method as described herein.

In a further aspect, the present disclosure provides a method of preparing a crosslinking agent. This method involves: (i) providing a mixture of non-oxidized sugar molecules; and (ii) reacting the non-oxidized sugar molecules with a benign oxidizing agent to cause oxidation of the non-oxidized sugar molecules to yield a mixture of oxidized sugar molecules having at least two aldehyde groups, said oxidized sugar molecules corresponding a crosslinking agent effective to infiltrate non-crosslinked protein fibers to yield a population of crosslinked protein fibers.

In another aspect, the present disclosure provides a crosslinking agent produced according to the corresponding method as described herein.

These and other objects, features, and advantages of this invention will become apparent from the following detailed description of the various aspects of the invention taken in conjunction with the accompanying drawings.

BRIEF DESCRIPTION OF THE DRAWINGS

For the purpose of illustrating aspects of the present invention, there are depicted in the drawings certain embodiments of the invention. However, the invention is not limited to the precise arrangements and instrumentalities of the embodiments depicted in the drawings. Further, as provided, like reference numerals contained in the drawings are meant to identify similar or identical elements.

FIG. 21A shows the treated fabric having no wrinkles (right side) as compared to untreated fabric sample (left side). FIG. 21B shows an untreated control woolen fabric showing wrinkles.

DETAILED DESCRIPTION OF THE INVENTION

Figure 1:
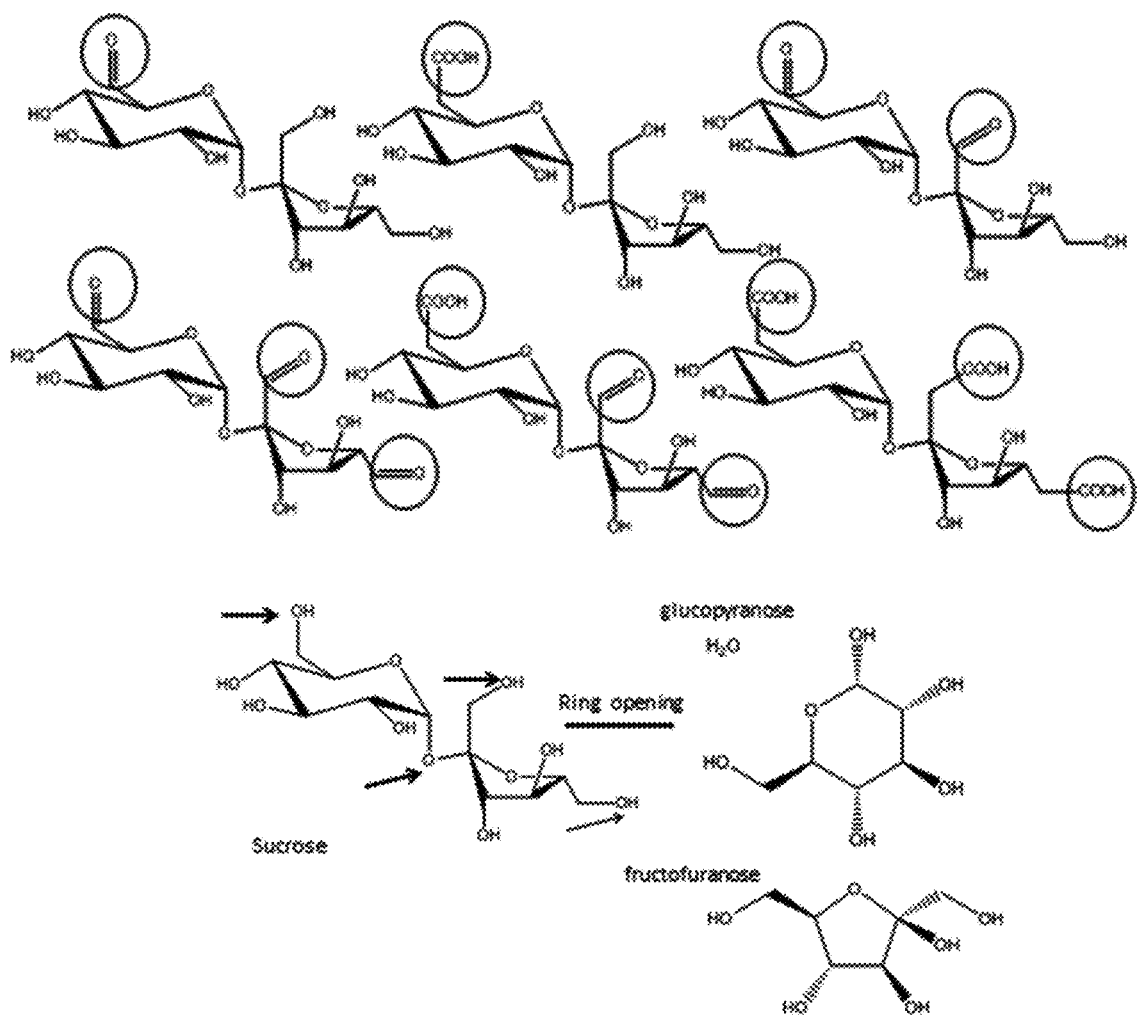
FIG. 1 is a scheme of an oxidation process of sucrose.

The present disclosure relates to, inter alia, a green technology for crosslinking protein molecules for various uses, where the protein molecules can be contained in protein fibers such as, but not limited to, human hair, animal fibers, and mixtures thereof. The green technology of the present disclosure provides crosslinking agents, formulations, and methods of making and using such crosslinking agents and formulations. In regard to one particular advantage of the green technology of the present disclosure over the existing art of treating hair or animal fibers, the presently disclosed green technology does not require the use of harsh chemicals or harmfully high temperatures to achieve permanent or substantially improved permanence of the desired structural changes from the hair or animal fiber treatments. Provided below is a more detailed description of the various aspects of the green technology of the present disclosure.

As used herein, the term "protein fibers" refers to any fiber material that includes protein as a component of the fiber. Protein fibers of the present disclosure include, without limitation, any fibers that contain protein molecules, and particularly protein molecules that have amino acids with functional groups (e.g., amine groups) that can react with an aldehyde group (e.g., to form a bond or link). Non-limiting examples of amino acids with such suitable functional groups include amino acids such as arginine and lysine. Non-limiting examples of particular types of protein fibers of the present disclosure are keratin-containing fibers.

As provided herein, "keratin-containing fibers" can include, without limitation, human hair, animal fibers, or a mixture thereof. In accordance with the present disclosure, the human hair can be any type of hair, regardless of the color, three dimensional structure, age, texture, fineness, etc. In accordance with the present disclosure, the animal fibers can include, without limitation, wool, alpaca, angora, fur, cashmere, mohair, qiviut, or mixtures and variations thereof. Non-limiting examples of animals that can provide the animal fibers of the present disclosure include animals such as sheep, vicuna, alpaca, llama, muskox, goats, bison, camel, yak, horse, chinchilla, rabbit, or related species thereof. Further, as in accordance with the present disclosure, the animal fibers can have various forms, including, without limitation, forms such as raw fibers, yarns, felts, woven or knitted fabrics, and the like.

As used herein to describe human hair or animal fibers or animal fabrics, the term "three dimensional structure" (3D structure) refers to the structural shape of the hair, animal fiber, or animal fabric. Non-limiting examples of 3D structures of human hair can include straight hair, wavy hair, curly hair, kinky hair, or variations thereof. Non-limiting examples of 3D structures of animal fibers or animal fabrics can include forms such as creased fabrics, non-creased fabrics, pleated fabrics, flat fabrics, roughened surface fabrics, wrinkled fabrics, and variations thereof.

As described herein, the green technology of the present disclosure involves the use of a crosslinking agent. As used herein, the term "crosslinking agent" refers to an agent that includes an oxidized sugar, and particularly an oxidized sugar that includes at least two aldehyde groups. The sugar of the oxidized sugar can include or be based on monosaccharides, disaccharides, trisaccharides, tetrasaccharides, and oligosaccharides. Non-limiting examples of particular types of sugars in accordance with the present disclosure include galactose, sucrose, maltose, lactose, raffinose, stachyose, and mixtures thereof.

Figure 2:
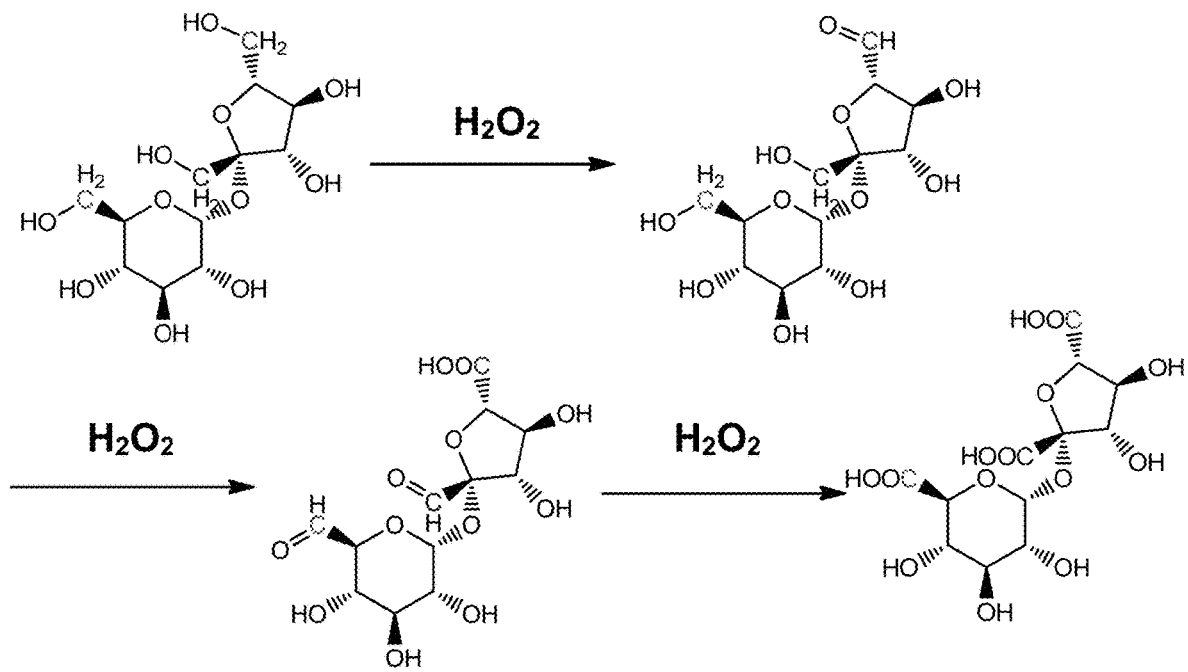
FIG. 2 is a scheme illustrating the oxidation of sucrose using hydrogen peroxide ($H_2O_2$) as the benign oxidizing agent, with aldehyde groups and subsequent carboxyl groups being formed during the oxidation process.
Figure 3:
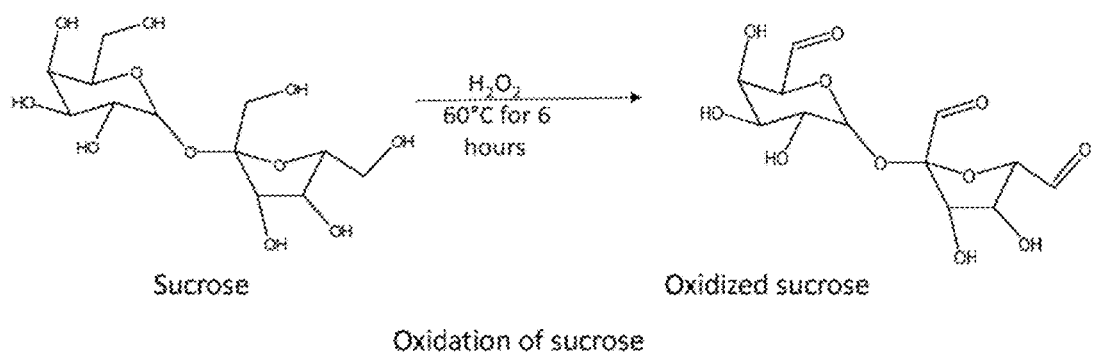
FIG. 3 is a scheme illustrating the oxidation of sucrose using hydrogen peroxide ($H_2O_2$) as the benign oxidizing agent.
Figure 4:
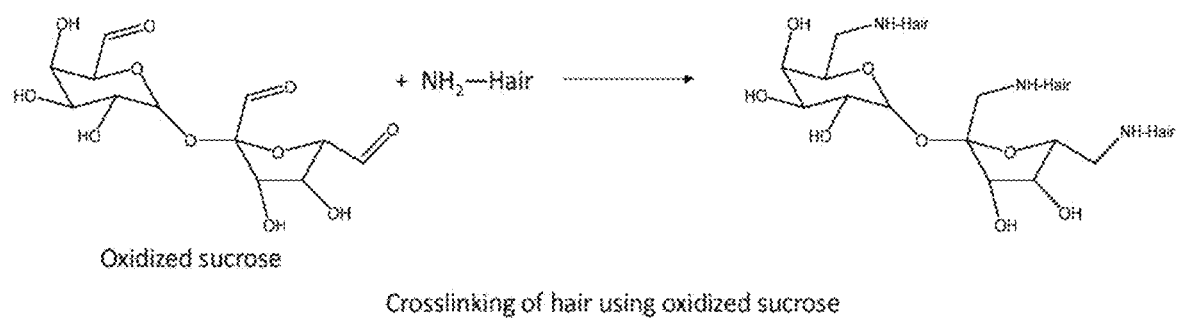
FIG. 4 is a scheme illustrating crosslinking of hair using oxidized sucrose.
Figure 5:
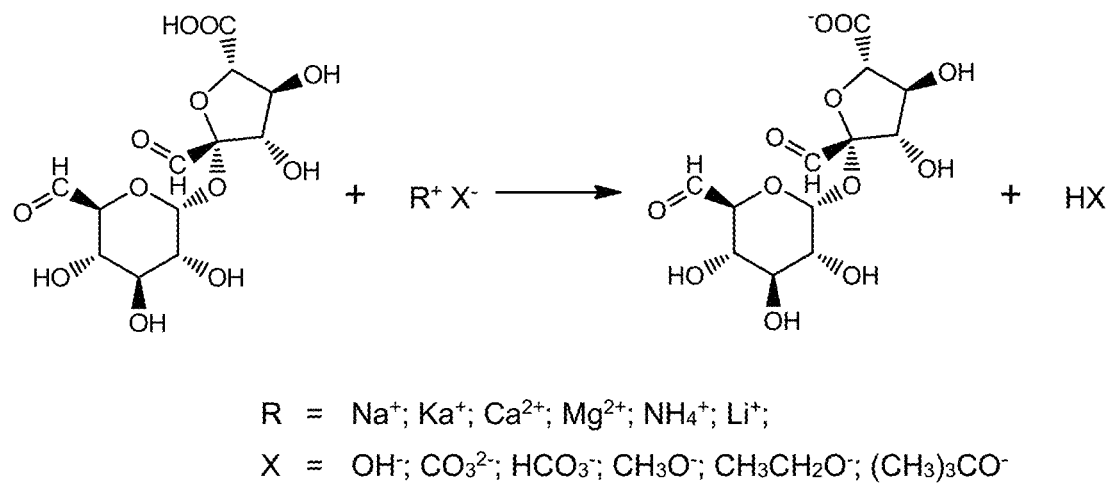
FIG. 5 is a scheme illustrating the chemistry of neutralization of oxidized sucrose, where hydrogen peroxide ($H_2O_2$) is used as the benign oxidizing agent.

FIG. 1 illustrates one scheme for the oxidation of sugar to yield oxidized sugar products that can be used as crosslinking agents of the present disclosure. The scheme of FIG. 1 shows the oxidation of sucrose, which scheme is further described in Dastidar et al., *Green Chemistry*, 15:3243-3251 (2013), which is hereby incorporated by reference herein in its entirety. FIG. 2 and FIG. 3 are also schemes for the oxidation of sugars, particularly sucrose, where hydrogen peroxide ($H_2O_2$) is used as the benign oxidizing agent. FIG. 4 illustrates a scheme of the crosslinking of hair using oxidized sugar produced by the scheme of FIG. 3. FIG. 5 is a scheme showing the chemistry of neutralization of oxidized sucrose, where hydrogen peroxide ($H_2O_2$) is used as the benign oxidizing agent.

In one aspect, the present disclosure provides a method of crosslinking protein fibers. The method involves: (i) providing a crosslinking agent comprising an oxidized sugar having at least two aldehyde groups; and (ii) infiltrating a plurality of non-crosslinked protein fibers with the crosslinking agent under conditions effective to cause protein molecules contained in the non-crosslinked protein fibers to become crosslinked, thereby yielding a population of crosslinked protein fibers. The protein molecules of the non-crosslinked protein fibers comprise amine groups that react with the aldehyde groups of the oxidized sugar to achieve the crosslinking of the protein molecules to yield the crosslinked protein fibers.

As used herein, the term "infiltrating" generally refers to a process by which a crosslinking agent infiltrates protein fibers so as to allow the crosslinking agent to react with the protein molecules contained in the protein fibers. Once the crosslinking agent reacts with the protein molecules, the protein molecules can then be crosslinked, thereby resulting in protein fibers that are then considered crosslinked. The term "diffusion" can also be used to describe this infiltrating or infiltration of the crosslinking agent into the protein fibers.

In one embodiment, the crosslinking agent is an aqueous solution having at least 1-60 weight percent of the oxidized sugar.

In a particular embodiment of this method, the infiltrating step is carried out at a temperature selected from the group consisting of less than 100° C., less than 90° C., less than 80° C., less than 70° C., less than 60° C., less than 50° C., less than 40° C., less than 30° C., and less than 20° C., and for a length of time sufficient to yield the population of crosslinked protein fibers at said temperature used for carrying out the infiltrating step. Generally, the lower the temperature, the longer the time is needed for infiltration or diffusion to occur. Non-limiting examples of suitable infiltration times can range from seconds to hours, including, for example, a range of less than a minute to less than 10 minutes, as well as a range of about 10 minutes to 4 hours or more, depending on the temperature used.

In accordance with the present disclosure, in certain embodiments of this method, the infiltrating step is carried out at a pH of between about 7 and about 12, or more particularly at a pH of between about 10 and about 12. Generally, a higher pH is preferred as it relaxes hair and wool and increases infiltration/diffusion of the crosslinking agent of the present disclosure (i.e., the oxidized sugar).

In another embodiment, this method can further comprise heating the population of crosslinked protein fibers at a temperature of between about 100° C. and about 220° C. for a period of time of between about 3 seconds and about 120 seconds to substantially complete the crosslinking. In a particular embodiment, the temperature of the heating step can range from about 120° C. to about 220° C., and more particularly from about 140° C. to about 160° C. Temperatures below 220° C. and even below 160° C. are preferred in certain embodiments where there is a concern about extensive damage to the protein fibers, particularly to human hair. In accordance with the present disclosure, protein fibers such as animal fibers (like wool) can withstand temperatures at the higher end of the range of temperatures.

In a particular embodiment of this method, the heating step is carried out by applying a source of heat to the population of crosslinked protein fibers. As used herein, the concept of "heating" the protein fibers is meant to refer to the process of subjecting the protein fibers to a particular raised temperature. Therefore, when describing the temperature of the heating step, reference is made to the "ambient temperature" and not the temperature of the protein fibers themselves (e.g., human hair or animal fibers).

Non-limiting examples of the source of heat is for the heating step include sources such as a flat iron, hot rollers, a hot plate, a curling iron, a hair dryer, an iron, a clothes dryer, an oven, etc.

In another embodiment, this method further comprises washing the population of crosslinked protein fibers to remove residual crosslinking agent or to remove crosslinking agent adhering to the protein fibers, thereby substantially removing the crosslinking agent. In one particular embodiment, the washing is carried out using water or soap water. The soap water can include, without limitation, detergents, shampoo, and any other solution containing an agent effective to remove the residual crosslinking agent from the protein fiber mixture or to remove crosslinking agent adhering to the protein fibers.

In accordance with one embodiment of this method, the crosslinking agent is prepared according to a method comprising the steps of: (i) providing a mixture of non-oxidized sugar molecules; and (ii) reacting the non-oxidized sugar molecules with a benign oxidizing agent to cause oxidation of the non-oxidized sugar molecules to yield a reaction mixture comprising oxidized sugar molecules having at least two aldehyde groups, said oxidized sugar molecules corresponding to the crosslinking agent.

In one embodiment, the oxidation is carried out at a temperature selected from the group consisting of less than 100° C., less than 90° C., less than 80° C., less than 70° C., less than 60° C., less than 50° C., less than 40° C., and less than 30° C.

In one embodiment, the oxidation is carried out at a pH of between about 2 and about 4.

A suitable benign oxidizing agent can include any agent effective to oxidize sugar so that the oxidized sugar includes at least two aldehyde groups, where the agent is considered "green" as opposed to being more of a harsh or toxic chemical agent. A non-limiting example of a benign oxidizing agent is hydrogen peroxide ($H_2O_2$). In certain embodiments, the hydrogen peroxide ($H_2O_2$) is acidified.

In accordance with one embodiment, in preparing the crosslinking agent, the method further comprises introducing an enzyme to the reaction mixture to inhibit further oxidation of aldehyde groups of the oxidized sugar molecules to carboxyl groups. Suitable enzymes can include any enzyme that is effective to inhibit the oxidation of the sugar molecules. In particular embodiments, if the benign oxidizing agent is hydrogen peroxide ($H_2O_2$), the enzyme can be any enzyme effective to catalyze decomposition of the hydrogen peroxide into oxygen (O) and water ($H_2O$). Non-limiting examples of suitable enzymes for this purpose include any catalase (e.g., GC 118 enzyme by DUPONT®) and any peroxidase.

In accordance with one embodiment, the enzyme is introduced at a point in the oxidation reaction so as to yield a mixture of oxidized sugar molecules having a greater concentration of aldehyde groups as compared to carboxyl group.

In a further embodiment, this method further comprises removing residual amounts of the benign oxidizing agent after introducing the enzyme.

As described further herein, the method of crosslinking protein fibers of the present disclosure can involve maintaining as well as changing the three dimensional structure of a population of crosslinked protein fibers. In one embodiment of this method, the population of crosslinked protein fibers has an initial three dimensional (3D) structure. In a further embodiment of this method, the population of crosslinked protein fibers is further treated to form the population of crosslinked protein fibers into a second 3D structure that is different from its initial 3D structure. As provided in certain embodiments, the initial 3D structure and the second 3D structure are selected from the group consisting of a creased fabric, a non-creased fabric, a pleated fabric, wrinkled, wrinkle-free, straight hair, wavy hair, curly hair, kinky hair, and variations thereof, as well as any other 3D structures described elsewhere herein or known in the art.

In another aspect, the present disclosure provides a formulation for crosslinking protein fibers. The formulation includes a crosslinking agent comprising a plurality of oxidized sugars having at least two aldehyde groups, where the crosslinking agent is formulated so that the aldehyde groups of the oxidized sugars are effective to react with amine groups of protein molecules contained in the non-crosslinked protein fibers to yield a population of crosslinked protein fibers.

In one embodiment, the formulation is in a form of a paste. In another embodiment, the formulation is in a form of an aqueous solution. In a particular embodiment, the aqueous solution comprises at least 40 weight percent of water. In another embodiment, the aqueous solution comprises at least 1-60 weight percent of the oxidized sugar. In a further embodiment, the formulation has a stable concentration of aldehyde groups. In a particular embodiment, the stable concentration of aldehyde groups is between about 20 and about 32 percent.

In accordance with the present disclosure, in certain embodiments, the formulation is substantially free of an oxidizing agent so that the stable concentration of aldehyde groups is maintained prior to reaction of the aldehyde groups with the amine groups of the protein molecules contained in the non-crosslinked protein fibers.

In a further aspect, the present disclosure provides a method of treating human hair to maintain a desired three dimensional structure. This method involves: (i) providing a formulation as described herein; and (ii) treating a population of human hair with the formulation so as to maintain the desired three dimensional (3D) structure of the population of human hair, where the human hair comprises non-crosslinked protein fibers having protein molecules having amine groups that react with the aldehyde groups of the oxidized sugar of the formulation.

As discussed herein, in certain embodiments of this method of treating human hair, the desired 3D structure of the human hair is selected from the group consisting of straight hair, wavy hair, curly hair, kinky hair, or variations thereof.

In one embodiment of this method, the treating step comprises infiltrating the non-crosslinked protein fibers with the crosslinking agent of the formulation to yield a population of crosslinked protein fibers having the desired 3D structure.

In accordance with one embodiment, the infiltrating step is carried out at a temperature selected from the group consisting of less than 100° C., less than 90° C., less than 80° C., less than 70° C., less than 60° C., less than 50° C., less than 40° C., less than 30° C., and less than 20° C., and for a length of time sufficient to yield the population of crosslinked protein fibers at said temperature used for carrying out the infiltrating step. For instance, as a non-limiting example, this step can be done when starting with curly hair, where curly hair is also the desired 3D structure.

In one embodiment of this method, the treating step comprises infiltrating the non-crosslinked protein fibers with the crosslinking agent of the formulation to yield an initial population of crosslinked protein fibers having an initial 3D structure that is not the desired 3D structure to be maintained.

In a further embodiment of this method, the method can also include manipulating the initial population of crosslinked protein fibers having the initial 3D structure so as to form into a final population of crosslinked protein fibers having the desired 3D structure.

In one embodiment, the manipulating step comprises heating the initial population of crosslinked protein fibers at a temperature of between about 100° C. and about 220° C. for a period of time of between about 3 seconds and about 120 seconds to substantially complete the crosslinking, where said heating is performed before, during, or after the forming of the initial population of crosslinked protein fibers into the final population of crosslinked protein fibers having the desired 3D structure.

In accordance with one embodiment, the heating is carried out by applying a source of heat to the population of crosslinked protein fibers. The source of heat can be, without limitation, selected from the group consisting of a flat iron, hot rollers, a hot plate, a curling iron, a hair dryer, an iron, a clothes dryer, an oven, etc.

In accordance with one embodiment of this method, the method can further comprise washing the population of crosslinked protein fibers to remove residual crosslinking agent or to remove crosslinking agent adhering to the protein fibers, thereby substantially removing the crosslinking agent. This method also can be such that the washing is carried out using water or soap water. The infiltrating step can be carried out at a pH of between about 7 and about 12.

In another aspect, the present disclosure provides a method of treating animal fibers to maintain a desired three dimensional structure. This method involves: (i) providing a formulation as described herein; and (ii) treating a population of animal fibers with the formulation so as maintain the desired three dimensional (3D) structure of the population of the animal fiber, where the animal fiber comprises non-crosslinked protein fibers having protein molecules having amine groups that react with the aldehyde groups of the oxidized sugar of the formulation.

In one embodiment, the desired 3D structure of the animal fiber is in a form of a fabric selected from the group consisting of a creased fabric, a non-creased fabric, a pleated fabric, a flat fabric, a roughened surface fabric, and variations thereof.

In accordance with one embodiment, treating step comprises infiltrating the non-crosslinked protein fibers with the crosslinking agent of the formulation to yield a population of crosslinked protein fibers having the desired 3D structure.

In accordance with one embodiment, the infiltrating step is carried out at a temperature selected from the group consisting of less than 200° C., less than 150° C., less than 100° C., less than 90° C., less than 80° C., less than 70° C., less than 60° C., less than 50° C., less than 40° C., less than 30° C., and less than 20° C., and for a length of time sufficient to yield the population of crosslinked protein fibers at said temperature used for carrying out the infiltrating step.

In accordance with one embodiment, treating step comprises infiltrating the non-crosslinked protein fibers with the crosslinking agent of the formulation to yield an initial population of crosslinked protein fibers having an initial 3D structure that is not the desired 3D structure to be maintained.

In one embodiment, the method further comprises manipulating the initial population of crosslinked protein fibers having the initial 3D structure so as to form into a final population of crosslinked protein fibers having the desired 3D structure.

In accordance with one embodiment, the manipulating step comprises heating the initial population of crosslinked protein fibers at a temperature of between about 100° C. and about 220° C. for a period of time of between about 3 seconds and about 120 seconds to substantially complete the crosslinking, where said heating is performed before, during, or after the forming the initial population of crosslinked protein fibers into the final population of crosslinked protein fibers having the desired 3D structure.

In accordance with one embodiment, the heating is carried out by applying a source of heat to the population of crosslinked protein fibers. In one embodiment, the source of heat is selected from the group consisting of a flat iron, an iron, a clothes dryer, an oven, etc.

In accordance with one embodiment, the method further comprises washing the population of crosslinked protein fibers to remove residual crosslinking agent or to remove crosslinking agent adhering to the protein fibers, thereby substantially removing the crosslinking agent. In one embodiment, the washing is carried out using water or soap water. In one embodiment, the infiltrating step is carried out at a pH of between about 7 and about 12.

In accordance with one embodiment, the animal fibers are selected from the group consisting of wool, alpaca, angora, fur, cashmere, mohair, and qiviut. In accordance with one embodiment, the animal fibers are from animals selected from the group consisting of sheep, vicuna, alpaca, llama, muskox, goats, bison, camel, yak, horse, chinchilla, and rabbit. In accordance with one embodiment, the animal fibers have a form selected from the group consisting of raw fibers, yarns, felts, and woven or knitted fabrics.

In accordance with one embodiment of this method, the sugar is selected from the group consisting of galactose, sucrose, maltose, lactose, raffinose, and stachyose.

In another aspect, the present disclosure provides a fabric comprising the treated animal fibers produced according to the corresponding method as described herein.

In a further aspect, the present disclosure provides a method of making a formulation for crosslinking protein fibers. This method involves: (i) providing a mixture of non-oxidized sugar molecules; and (ii) reacting the non-oxidized sugar molecules with a benign oxidizing agent to cause oxidation of the non-oxidized sugar molecules to yield a formulation comprising a mixture of oxidized sugar molecules having at least two aldehyde groups, where the mixture of oxidized sugar molecules are crosslinking agents effective to react with amine groups of protein molecules contained in non-crosslinked protein fibers to yield a population of crosslinked protein fibers.

In accordance with one embodiment of this method of making the formulation for crosslinking protein fibers, the method further comprises adding one or more of a preservative, a stabilizer, a filler, a coloring agent, a scent agent, a cosmetically acceptable carrier, an emulsifier, or mixtures thereof to the oxidized sugar molecules. The present disclosure contemplates the use of all such agents or compounds recognized by those of ordinary skill in the art.

In accordance with one embodiment, this method further comprises packaging the crosslinking agent under cosmetically suitable conditions to provide cosmetically acceptable shelf-life. Suitable packaging materials, designs, and packaging methods include any such materials, designs, or methods suitable for use in the relevant art.

In another aspect, the present disclosure provides a formulation produced according to the corresponding method as described herein.

In a further aspect, the present disclosure provides a method of preparing a crosslinking agent. This method involves: (i) providing a mixture of non-oxidized sugar molecules; and (ii) reacting the non-oxidized sugar molecules with a benign oxidizing agent to cause oxidation of the non-oxidized sugar molecules to yield a mixture of oxidized sugar molecules having at least two aldehyde groups, said oxidized sugar molecules corresponding a crosslinking agent effective to infiltrate non-crosslinked protein fibers to yield a population of crosslinked protein fibers.

In accordance with one embodiment of this method of preparing the crosslinking agent for crosslinking protein fibers, the method further comprises adding one or more of a preservative, a stabilizer, a filler, a coloring agent, a scent agent, a cosmetically acceptable carrier, an emulsifier, or mixtures thereof to the oxidized sugar molecules. The present disclosure contemplates the use of all such agents or compounds recognized by those of ordinary skill in the art.

In accordance with one embodiment, this method further comprises packaging the crosslinking agent under cosmetically suitable conditions to provide cosmetically acceptable shelf-life. Suitable packaging materials, designs, and packaging methods include any such materials, designs, or methods suitable for use in the relevant art.

As described herein, in certain aspects, the present disclosure provides a 'green' technology (e.g., methods, crosslinking agents, formulations) that involves crosslinking of hair (human, non-human), wool, or other protein or keratin fibers using green and sustainable chemicals that can retain the curliness or straightness, once crosslinked. The new green technology is also very inexpensive since the raw materials such as sugars used are inexpensive. A particular embodiment of a process of the green technology of the present disclosure is briefly described below.

In short, the sugars such as sucrose are oxidized using benign oxidizing agent such as hydrogen peroxide ($H_2O_2$) to obtain aldehyde groups, see Ghosh-Dastidar, *Green Chemistry*, 15(11):3243-3251 (2013) and published International Patent Application No. PCT/US2013/073956 (Dec. 9, 2013), the disclosures of which are incorporated by reference herein. Many sugars (5 carbon, 6 carbon), dimers, trimers, tetramers, etc., including stachyose, raffinose, and many others can also be oxidized and used as crosslinker as long as at least two aldehyde groups can be obtained on a single molecule. When the oxidized sugar is diffused in the hair, the aldehyde groups can react with the amine groups in keratin (human hair, wool, etc.) in amino acids such as lysine, arginine and possibly histidine, crosslinking the molecules. Sugar oxidation can also create carboxyl (COOH) groups which may also react with hydroxyl (OH) or amine ($NH_2$) groups. However, aldehyde groups are preferred as they react very fast with the amine groups and in many cases, at room temperature. Once crosslinked, the hair can retain their existing shape. For example, if a flat-iron is used the crosslinking reaction can be completed to the fullest extent possible due to its high temperature and the resultant hair will be much straight and if hot rollers are used, curly hair can be obtained. Since the crosslinking is chemical covalent bonding, and hence permanent, hair straightness or curliness or fizz can be expected to be retained for a long time. If high degree of crosslinking is obtained, hair may be washed without changing their straight or curly state.

In the case of woolen fabrics, dry cleaning is commonly recommended. While this is because of the felting (shrinkage due to the locking of the scales present on the wool surface) that occurs in washing/drying process, particularly when machine dried, woolen fabrics easily wrinkle when washed. Crosslinking wool (or other protein based fibers), with oxidized sugars as explained earlier, could be expected to retain the creases after washing, removing the need for ironing. The green crosslinking process described herein and below would also work with fabrics made with wool and other animal fibers such as cashmere, mohair, camel hair, alpaca, vicuna, etc., as well as fur fibers and silk. The crosslinking can also be used to obtain fabric stiffness. In many cases woolen fabrics are enzyme treated to remove the scales preventing felting when washed. In such cases, the wrinkle resistant fabrics can be easily washed in water cutting the dry cleaning costs.

EXAMPLES

The following examples are intended to illustrate particular embodiments of the present invention, but are by no means intended to limit the scope of the present invention.

Example 1

Oxidation of Sugar by Hydrogen Peroxide: The Process

Twenty (20) g sucrose was added into 150 mL distilled water in a 500-mL flask, stirred for 5 min to completely dissolve the sucrose, then 50 mL of hydrogen peroxide (30%) was added into solution, which made the final hydrogen peroxide concentration to be 7.5%. The oxidation reaction was performed at 60° C. for 12 hrs. These conditions may be varied depending on the needs. The oxidized sucrose was dried in oven at 50° C. for at least 2 days to obtain highly viscous liquid. In order to remove any residual hydrogen peroxide, oxidized sucrose can be re-dissolved and dried one or more times. The chemistry of sucrose oxidation is shown in FIG. 2.

As mentioned earlier, many sugars (5 carbon, 6 carbon), dimers, trimers, tetramers, etc., including stachyose, raffinose, and many others. It is, however, important to know that higher sugars such as dimers, trimers, tetramers, etc., may even be preferred since they can have more than one —OH groups that can be utilized for conversion to aldehyde groups.

Many of these sugars can also be obtained from natural sources such as defatted soy flour which contains up to 35% carbohydrates, mostly in the form of higher sugars. These can be obtained by simple filtration process where the protein can be insolubilized at their isoelectric point (around 4.5 pH) while dissolving the sugars which can be easily filtered. Oligomeric (small molecular weight) species of starches may also be oxidized. Particularly water soluble species could be useful in this process.

Example 2

Aldehyde Group Content Determination

Two grams of sample was dissolved in 100 mL distilled water in a 500-mL flask. The solution was adjusted to pH 3.2 with 0.5 N NaOH and 15 mL of hydroxylamine reagent was added. The flask was capped (using cork stopper) and placed in a 40° C. water bath for 4 hrs with slow stirring. The excess hydroxylamine was determined by rapidly back titrating the reaction mixture to pH 3.2 with standardized 0.5 N HCl. A blank (without oxidized sucrose) determination with only hydroxylamine reagent was performed in the same manner. The hydroxylamine reagent was prepared by first dissolving 30 g hydroxylamine hydrochloride in 100 mL of 5 N NaOH before the final volume was adjusted to 500 mL with distilled water.

Carbonyl group content was calculated as follows:

$$\text{Aldehyde content (\%)} = \frac{[\text{blank} - \text{sample}] \, \text{mL} \times \text{acid normality} \times 0.028 \times 100}{\text{sample weight in g (dry basis)}}$$

Table 1 presents the sucrose oxidation conditions used and their corresponding aldehyde contents obtained for three different processing conditions used. Different aldehyde content can be expected, when different conditions are applied, e.g. amount of sucrose, hydrogen peroxide concentration, reaction time and reaction temperature.

TABLE 1

Sucrose oxidation conditions and their corresponding aldehyde contents.

| | Treatment Conditions | Aldehyde Content (%) |
|---|---|---|
| A | 20 g sucrose in 200 mL 7.5% hydrogen peroxide, room temp, 12 hrs | 10.56 |
| B | 20 g sucrose in 200 mL 7.5% hydrogen peroxide, 60° C., 12 hrs | 7.7 |
| C | 20 g sucrose in 200 mL 15% hydrogen peroxide, room temp, 12 hrs | 9.45 |

Example 3

Hair Treatment and Characterization

Crosslinking of Human Hair (and Other Protein Fibers) Using Oven:

Human hair specimens cut to a length of 10 cm were used in this test. The hair pieces were washed with Tide detergent solution (0.36% concentration) and rinsed with continuous water for 3 min. Eight (8) g of oxidized sucrose was added to 125 mL beaker containing 50 mL of water. Different oxidized sucrose concentrations can be used as long as oxidized sucrose can be well diffused from solution into inner structure of the hair. Higher the amount of oxidized sucrose diffused inside hair, more the crosslinking achieved. This can lead to higher straightness of the hair (when treated with flat-iron) as well as increased retention in humid air. Concentrated sodium hydroxide solution was used to adjust pH to 11, soap washed hair specimens were immersed and stirred at 50° C. with stir speed of 70 rpm for 15 min, 30 min and 1 hr, separately, in 3 trials. Treated specimens were placed on a flat surface and straightened by hand (due to the adhesiveness of oxidized sucrose). Specimens maintained their straightness during drying process. Final curing was carried out at a higher temperature of 85° C. in an air circulating oven for 1 hr after which the specimens were washed in continuous water (tap water) and dried at RT in air. Specimens were conditioned by hanging vertically at 65% humidity and 21° C. (ASTM conditions).

Crosslinking of Human Hair (and Other Protein Fibers) Using Flat-Iron:

Small bundle of curly human hairs were used in this test. The hair bundles were washed with Tide detergent solution (0.36% concentration) and rinsed with continuous water for 3 min. Eight (8) g of oxidized sucrose was added to 125 mL beaker containing 50 mL of water. Concentrated sodium hydroxide solution was used to adjust pH to 11, soap washed hair specimens were immersed and stirred at 50° C. with stir speed at 70 rpm for 15 min, 30 min and 1 hr, respectively. Treated specimens were slowly flat-ironed for 10 times, and then specimens were washed in continuous water stream (tap water) and dried at RT in air. Specimens were conditioned by hanging vertically at 65% humidity and 21° C. (ASTM conditions).

Curly Index of Human Hair:

Curly index is defined as ratio of stretched length of hair to its length at rest (in the curly state). See Loussouarn et al., Int'l J. Dermatology, 46(s1):2-6 (2007), the disclosure of which is incorporated by reference herein.

Curly index was calculated as follows:

$$\text{Curly index} = \frac{\text{stretched length of hair}}{\text{relaxed length of hair}}$$

Ten hair specimens were used for measurement and their average was recorded.

Example 4

Woolen Fabric Treatment and Characterization

Washing (Purification) of Woolen Fabric:

Four (4) g of woolen fabric was immersed in 300 mL with 0.36% concentration of Tide detergent solution and raised the temperature to 60° C. and stirred for 30 min. Then the fabric was taken out of the solution and washed in 300 mL water for 5 min. The washing process was repeated for 4 times. The washed fabric was dried in an air circulating oven at 60° C. for one day.

Crosslinking of the fibers can retain their form and, hence, the fabric crease and enhance the wrinkle resistance. Crosslinking of the wool fibers can also make them slightly stiffer and as a result, the fabric stiffness may increase. This, however, can be taken as one of the confirming evidences of the crosslinking reactions.

Crosslinking of Woolen Fabric:

Three and a half (3.5) g of oxidized sucrose was added into 200 mL distilled water and the previously washed woolen fabric was immersed into the solution. The pH of the solution was adjusted to 7 using 0.5 N NaOH solution to neutralized carboxylic groups in the oxidized sucrose. Different concentration, as desired, may also be used. Higher concentration will result in higher crosslinking of the wool fibers. The chemistry of neutralization of oxidized sucrose is shown in FIG. 5. The purpose of neutralization is to avoid hydrolysis of peptide bond induced by acid environment, in other words, to retain the physical property of woolen fabric. However, mild acids do not affect the wool fibers. The mixture (neutralized oxidized sucrose solution+woolen fabric) was heated at 80° C. for 1 hr. After that the fabric was taken out of the solution. The fabric was hung vertically until there was no more dripping. The take up of the solution can be adjusted, as desired, through the solution concentration or pad and dry method. The fabric was then dried at 80° C. for 20 min and followed by 120° C. for 3 min. The unreacted residual solution was removed by washing the fabric in 300 ml water for 5 min. This washing process was repeated for 4 times.

Fabric Stiffness Test:

Stiffness of woolen fabric was measured by fabric stiffness tester. A typical apparatus is can be used. The test procedures are described by ASTM D1388. The woolen fabric was conditioned in ASTM standard environment of 21° C. and 65% relative humidity for 12 hrs before cutting the test specimens of 25 mm×200 mm dimensions. The specimen was placed on the stationary table and moved by hand in a smooth manner at approximately 120 mm/min (4.75 in/min) until the edge of the specimen touches the knife edge. The overhang length from the linear scale to the nearest 0.1 cm was recorded. Several readings were recorded to confirm the reproducibility.

Wash Durability Test:

Woolen fabric was immersed in 300 mL 0.36% Tide® detergent solution and temperature was raised to 60° C. and kept stirring for 15 min. Then the fabric was taken out of the solution and washed in 300 mL of water for 5 min. The washing process was repeated 4 times. The washed fabric was dried at 60° C. in an air circulating oven for one day.

Example 5

Human Hair Treatment: Results

Effect of Conditioning Duration on Curly Index of Treated Human Hair:

Oxidized sucrose treated human hairs (Brazilian curly hair) were conditioned, and the curly index was used to evaluate the durability of treatment. FIGS. 6A-6D show pictures of curly hair before and after treatments.

Figure 6A:
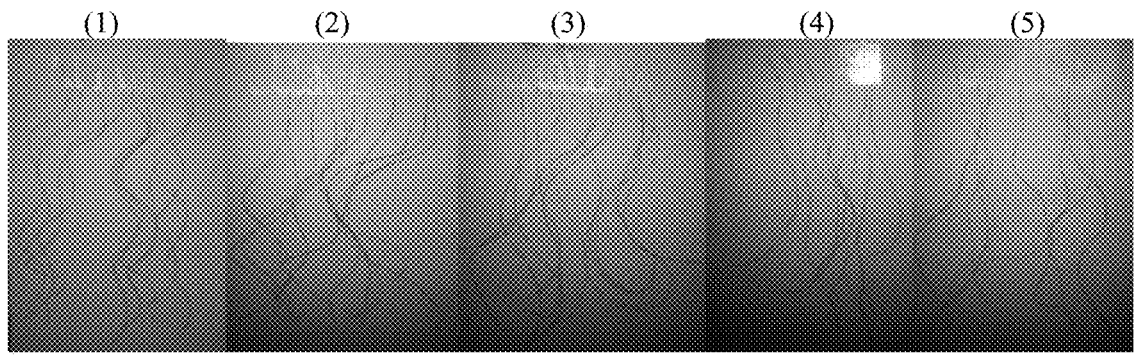
FIGS. 6A-6D are photographs of human hair before and after treatments with oxidized sugar.

FIG. 6A: Picture 1—'as received'; picture 2—soap water washed and air dried; picture 3—soap water washed, treated with oxidized sucrose solution for 10 min, oven cured at 85° C. for 1 hr, washed with continuous water and air dried; picture 4—soap water washed, treated with oxidized sucrose solution for 30 min, oven cured at 85° C. for 1 hr, washed with continuous water and air dried; picture 5—soap water washed, treated with oxidized sucrose solution for 1 hr, oven cured at 85° C. for 1 hr, washed with continuous water and air dried.

Figure 6B:
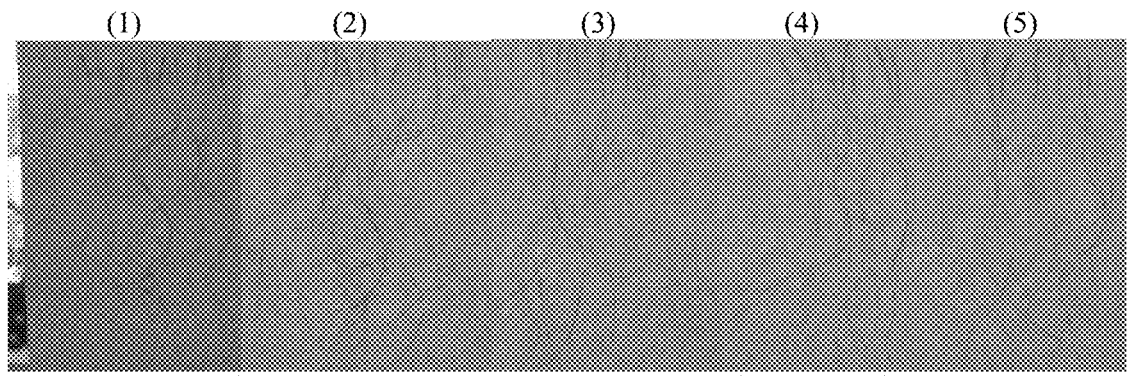

FIG. 6B: Picture 1—'as received' and conditioned for 4 days; picture 2—soap water washed, air dried and conditioned for 4 days; picture 3—soap water washed, treated with oxidized sucrose solution for 10 min, oven cured at 85° C. for 1 hr, washed with continuous water and air dried and conditioned for 4 days; picture 4—soap water washed, treated with oxidized sucrose solution for 30 min, oven cured at 85° C. for 1 hr, washed with continuous water and air dried and conditioned for 4 days; picture 5—soap water washed, treated with oxidized sucrose solution for 1 hr, oven cured at 85° C. for 1 hr, washed with continuous water and air dried and conditioned for 4 days.

Figure 6C:
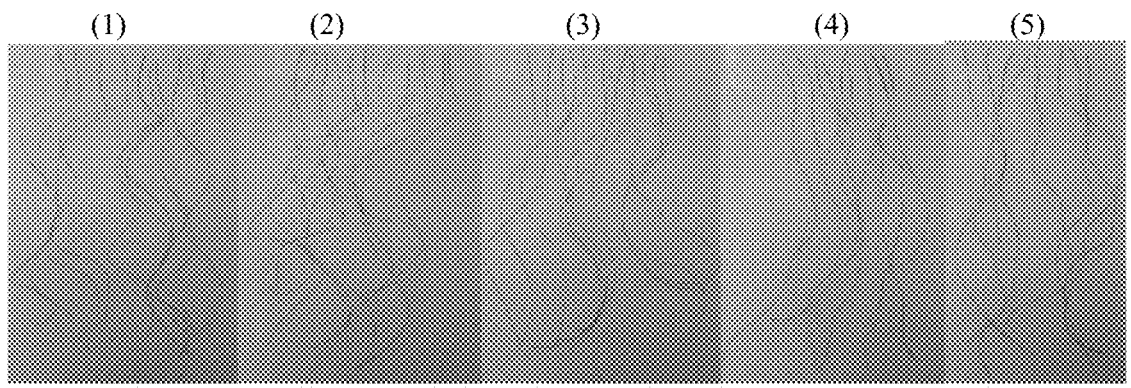

FIG. 6C: Picture 1—'as received' and conditioned for 8 days; picture 2—soap water washed, air dried and conditioned for 8 days; picture 3—soap water washed, treated with oxidized sucrose solution for 10 min, oven cured at 85° C. for 1 hr, washed with continuous water and air dried and conditioned for 8 days; picture 4—soap water washed, treated with oxidized sucrose solution for 30 min, oven cured at 85° C. for 1 hr, washed with continuous water and air dried and conditioned for 8 days; picture 5—soap water washed, treated with oxidized sucrose solution for 1 hr, oven cured at 85° C. for 1 hr, washed with continuous water and air dried and conditioned for 8 days.

Figure 6D:
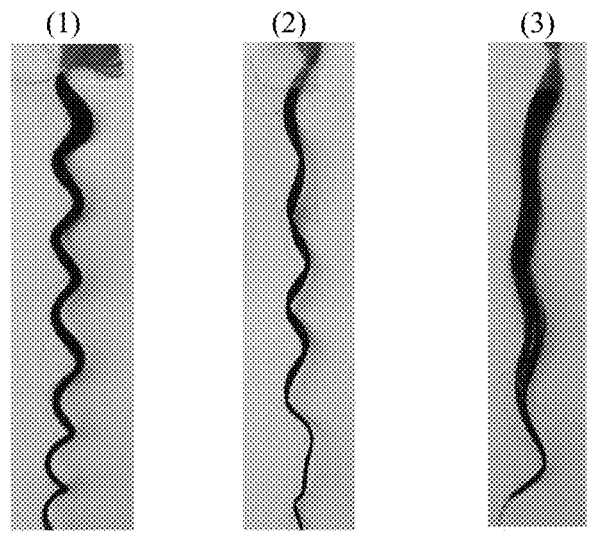

FIG. 6D: Picture 1—'as received'; picture 2—soap water washed and air dried; picture 3—soap water washed, treated with oxidized sucrose solution for 30 min, flat-ironed, washed with continuous water and air dried Curly indices of previously mentioned conditions were recorded and shown in Table 2.

TABLE 2

| Curly index of specimens before and after conditioning* | | | |
|---|---|---|---|
| Specimen | Before conditioning | After 4 days conditioning | After 8 days conditioning |
| 1 | 1.21 | 1.26 | 1.29 |
| 2 | 1.33 | 1.39 | 1.39 |
| 3 | 1.12 | 1.19 | 1.22 |
| 4 | 1.05 | 1.06 | 1.06 |
| 5 | 1.08 | 1.08 | 1.08 |
| 6 | 1.09 | | |

*Specimen 1—'as received'; specimen 2—soap water washed and air dried; specimen 3—soap water washed, treated with oxidized sucrose solution for 10 min, oven cured at 85° C. for 1 hr, washed with continuous water and air dried; specimen 4—soap water washed, treated with oxidized sucrose solution for 30 min, oven cured at 85° C. for 1 hr, washed with continuous water and air dried; specimen 5—soap water washed, treated with oxidized sucrose solution for 1 hr, oven cured at 85° C. for 1 hr, washed with continuous water and air dried; specimen 6—soap water washed, treated with oxidized sucrose solution for 30 min, flat-ironed, washed with continuous water and air dried.

Based on the results from FIGS. 6A-6D and Table 2 we can conclude that oxidized sucrose treated hair is able to retain straightness at high humidity (65% RH) environment. Higher the value of curly index meaning the greater the curliness of hairs, a curly index of 1 can represent a completely straighten hair. Number 2 hairs (soap washed and air dried) show a larger curve diameter compared with as received curly hairs, which explains the fact that curly index of number 2 hairs is higher than number 1. This means the soap washed and air dried hairs have higher curliness than the 'as received' hairs (number 1). Number 4 and 5 hairs shown lower curly index compared with number 3 hairs, meaning that 30 min or 1 hr treatment of hair with oxidized sucrose solution result in better crosslinking reaction compared with 10 min treatment. After 4 days of conditioning, curly index of number 4, 5 hairs are close to those before conditioning, however, number 1, 2, 3 hairs undergo larger curly index increase, which indicates high humidity environment causes hair to become more curly. After 8 days of conditioning, curly index of number 1 hairs increase to 1.29, however number 2 hairs retain same hair curliness. Number 3 hairs (treated for 10 min with oxidized sucrose, cured in oven, washed in water and air dried) continue increasing in curly index which implies that hairs with 10 min oxidized sucrose treatment do not have sufficient crosslinking to retain straightness. No change in curly index was observed for number 4 and 5 hairs between 4 and 8 days of conditioning, indicating 30 min or longer oxidized sucrose treatment provides sufficient amount of crosslinking to retain straightness under high humidity environment.

Oxidized sucrose solution was used to crosslinking bundle of hairs as well. As shown in FIG. 6D, Hair specimens were treated with oxidized sucrose solution (prepared 40 days before test) for 30 min, flat-ironed 10 times, washed with sufficient amount of tap water and air dried. Curly index decreased from 1.21 ("as-received") to 1.09 (oxidized sucrose solution treated hairs), which indicates that the oxidized sucrose solution treated hairs can be further crosslinked using commercial flat-iron. Similar results were observed when hairs were cured by oven and flat-iron.

These results indicate that the 'Green' technology developed here of using oxidized sucrose to crosslink hair has been successful. Our results showed a significant improvement in hair straightness after treating with oxidized sucrose and straightness could be well maintained under high humidity environment. Further, crosslinking of oxidized sugar treated hairs can be achieved by using commercial flat-iron.

Example 6

Woolen Fabric: Results

Figure 7:
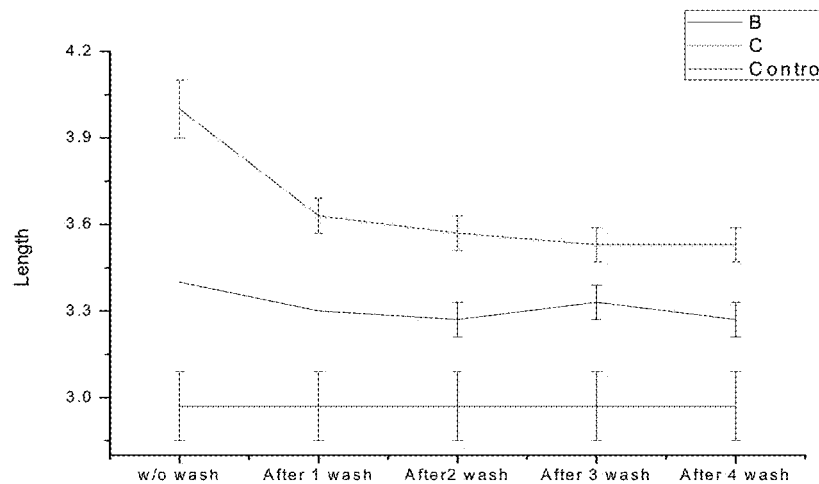
FIG. 7 is a graph showing crosslinked woolen fabric stiffness as a function of number of washes.

In the case of sucrose, the aldehyde content was higher when the reaction was carried out at room temperature, and the higher hydrogen peroxide concentration resulted in slight lower aldehyde content. Table 3 presents the stiffness of the control and the treated (crosslinked) woolen fabrics before and after up to 4 separate washings. FIG. 7 presents the crosslinked woolen fabric stiffness as a function of number of washes.

TABLE 3

Stiffness test results of woolen fabrics crosslinked using oxidized sucrose

|   | w/o wash | After 1 wash | After 2 washes | After 3 washes | After 4 washes |
|---|---|---|---|---|---|
| B | 3.4 (±0) | 3.3 (±0) | 3.27 (±0.06) | 3.33 (±0.06) | 3.27 (±0.06) |
| C | 4 (±0.1) | 3.63 (±0.06) | 3.57 (±0.06) | 3.53 (±0.06) | 3.53 (±0.06) |
| Control | 2.97 (±0.12) | 2.97 (±0.12) | 2.97 (±0.12) | 2.97 (±0.12) | 2.97 (±0.12) |

The specimen B is the woolen fabric crosslinked by oxidized sucrose 'B' (as described in Table 1), and the specimen C is the wool fabric crosslinked by oxidized sucrose 'C'. For comparison, control (untreated) fabric stiffness has also been shown. There was no change in the stiffness of the untreated fabric after up to 4 washings. It is clear that the fabric stiffness corresponded with the aldehyde content in the oxidized sucrose. Fabric treated with oxidized sucrose ' C' showed significantly higher stiffness than the fabric treated with oxidized sucrose 'B'. After the first washing the stiffness reduced for both treated fabrics. However, after 4 washings the stiffness of both treated fabrics was much higher with treatment with 'C' much higher than treatment with 'B'. Also, it is clear from the data that the stiffness of the fabric treated with 'C' stabilized after 4 washings. It should be possible to increase the aldehyde content higher by simply increasing the concentration. This can give even better treatment results. It is expected that the crease retention will be higher for these fabrics as well.

From the results on hair and woolen fabrics discussed here, it may be concluded that the 'green' treatment developed here can be easily used for crease retention of woolen and other protein fibers.

Woolen Fabric Stiffness Crease Resistance:

The results of the crease retention and wrinkle resistance tests and the related detailed processes are provided in FIGS. 9, 10, 11A-11B, 12A-12B, 13, 14A-14B, 15A-15B, 16, 17A-17B, 18A-18B, 19, 20, and 21A-21B. These tests clearly indicate that the woolen fabrics 1) retain crease after washing and 2) are not wrinkled after washing.

Example 7

Oxidization of Sucrose to Sucrose Aldehyde 40 g of sucrose was dissolved in 50 ml DI water. Then 50 ml of 30% hydrogen peroxide was added to the sucrose solution. Thus, the final concentration of the hydrogen peroxide used was 15%. This solution was kept in a bath at 60° C. with constant magnetic stirring at 200 rpm to carry out the oxidation of sucrose to get aldehyde groups. At the end of 6 hours, the solution was cooled down to room temperature. The pH of this mixture at this point was found to be 2±0.1. It was then adjusted to pH 6 using NaOH and heated to 50° C. 30 µl of catalase (GC 118, DuPont) was then added to the oxidized sucrose aldehyde solution at 50° C. to stop further oxidization of aldehydes into acids and stirred at 200 rpm for 10 minutes. Catalase catalyses the decomposition of hydrogen peroxide into oxygen and water. The pH was then adjusted to 10.5 using NaOH to treat the hair. FIG. 3 illustrates the scheme of oxidation of sucrose. A variety of catalases and peroxidases can be used.

Example 8

Hair Straightening Process

Figure 8:
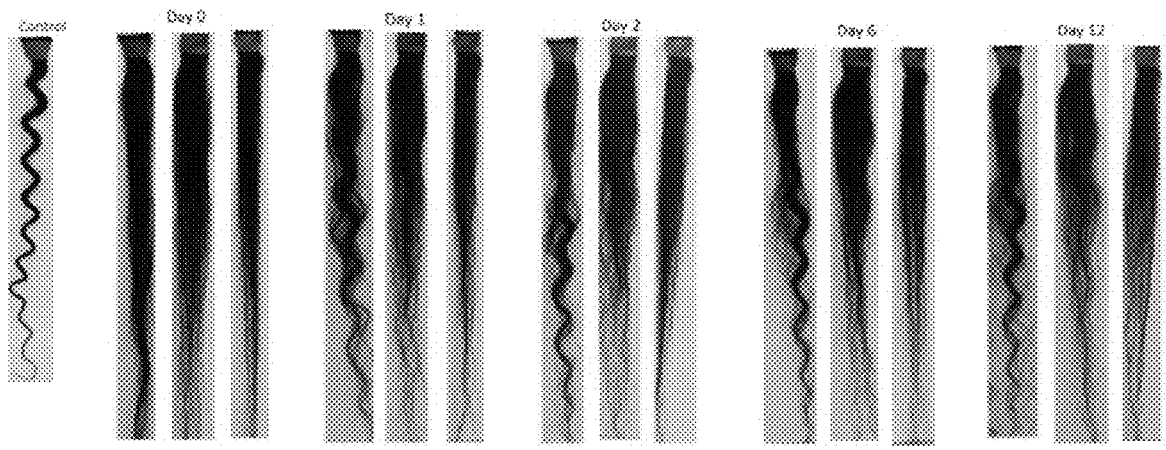
FIG. 8 is a photograph of hair treated with an oxidized sugar after various times and treatment with flat ironing.
Figure 9:
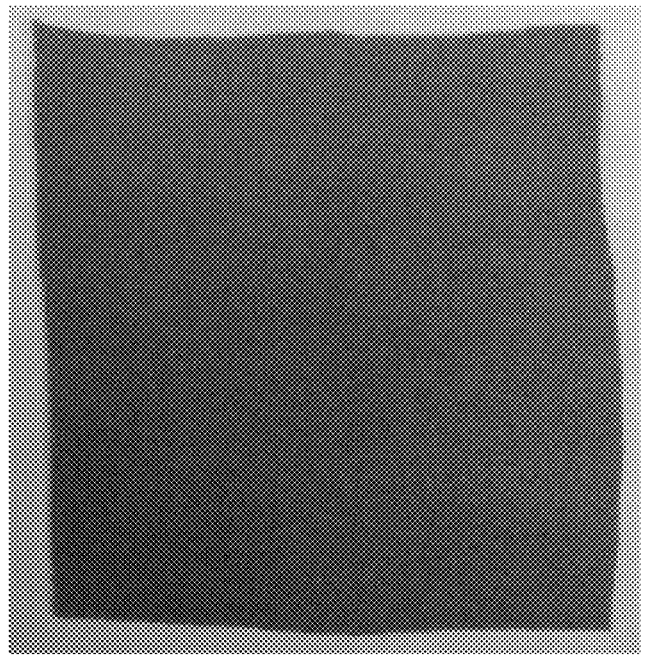
FIG. 9 is a photograph of woolen fabric "as-received" and before treatment.
Figure 10:
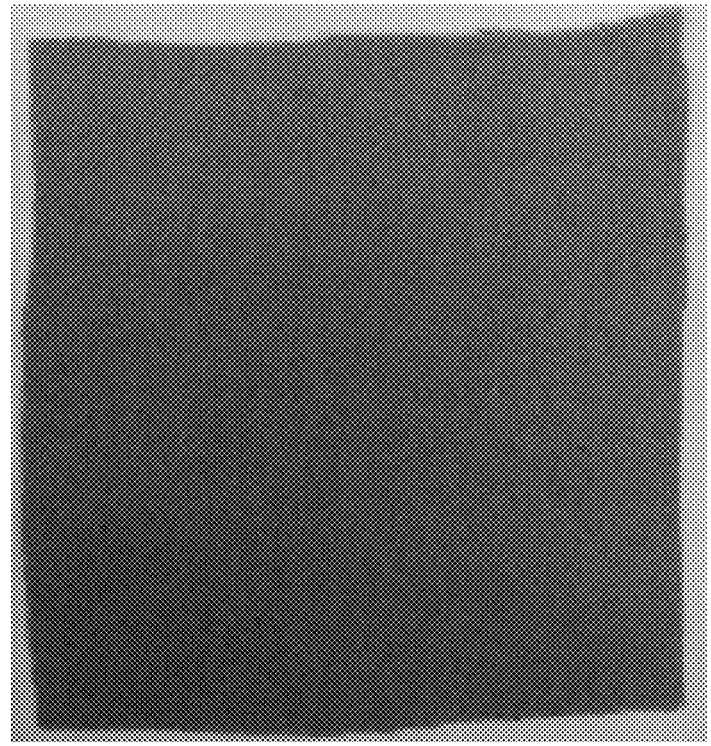
FIG. 10 is a photograph of a control woolen fabric (without any treatment). It is shown as ironed flat (ironed 5 minutes per side).
Figure 11A:
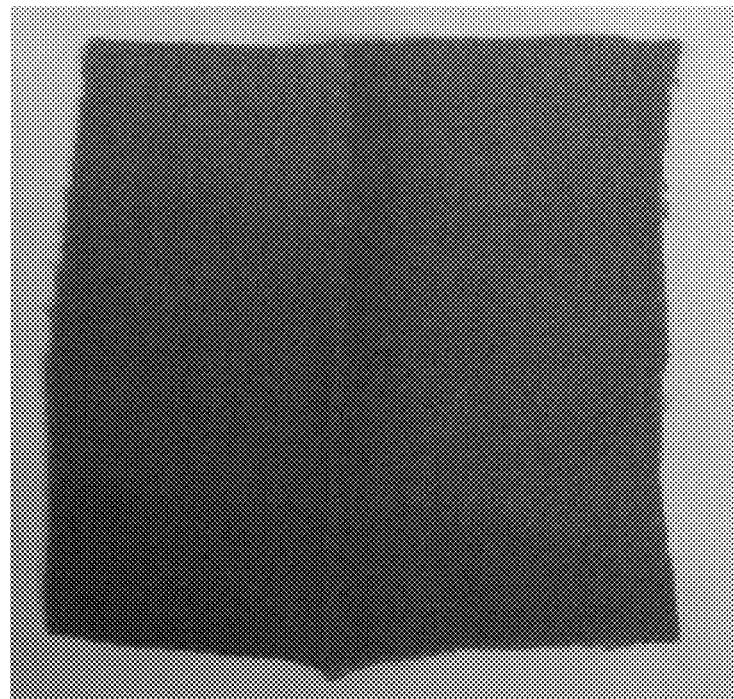
FIGS. 11A-11B are photographs of control woolen fabric (without any treatment). The fabric is ironed with a crease (folded in the middle, ironed 5 minutes per side).
Figure 11B:
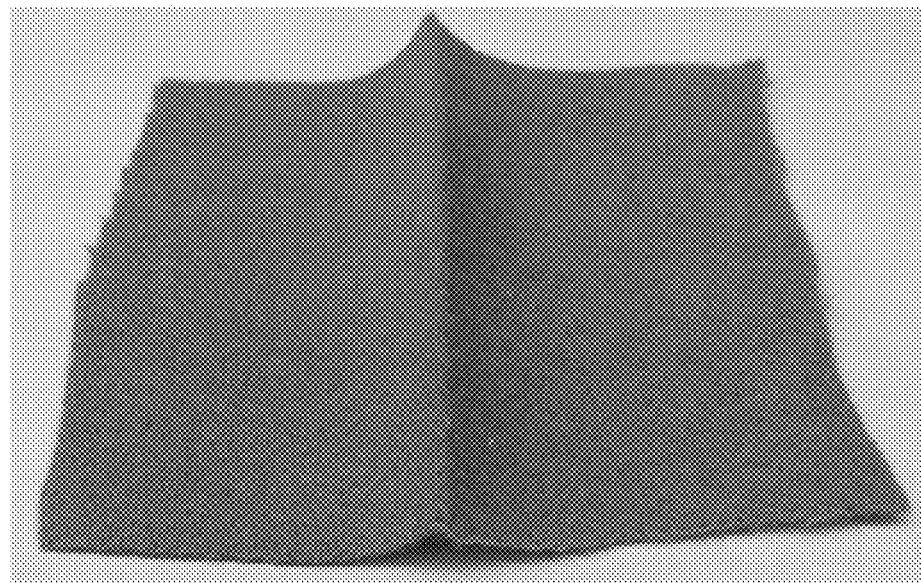
Figure 12A:
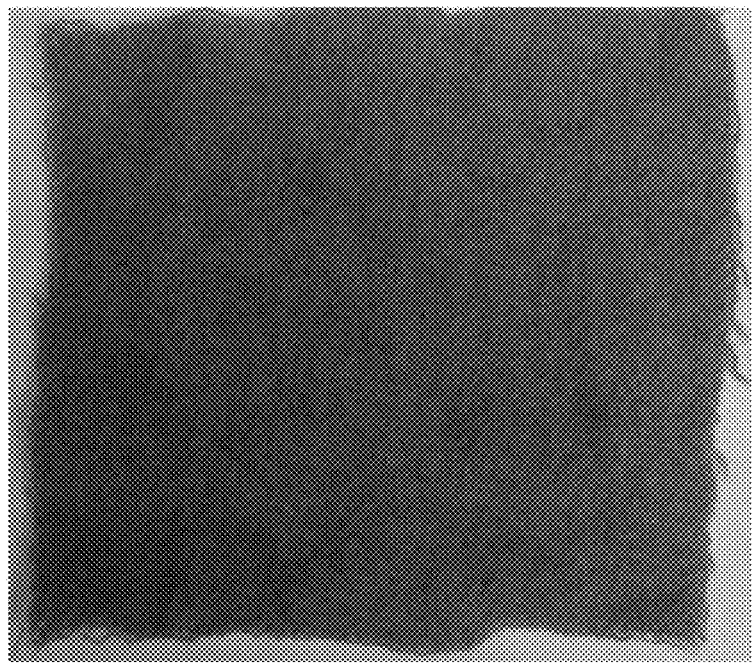
FIGS. 12A-12B are photographs of control woolen fabric (without any treatment). The fabric is (i) ironed with a crease (folded in the middle, ironed 5 minutes per side); (ii) washed with detergent (300 mL 0.36% Tide for 15 min, rinsed with large amount of water); and (iii) dried in an oven (80° C.). The fabric is wrinkled as all woolen fabrics do after regular washing.
Figure 12B:
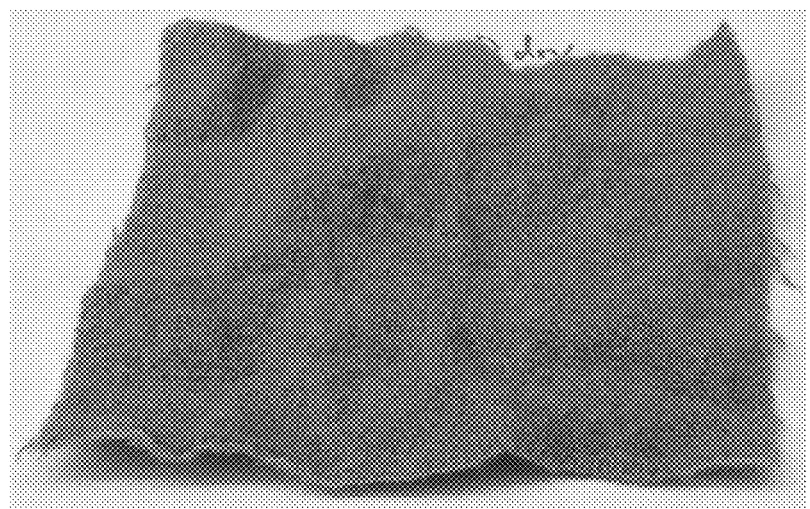
Figure 13:
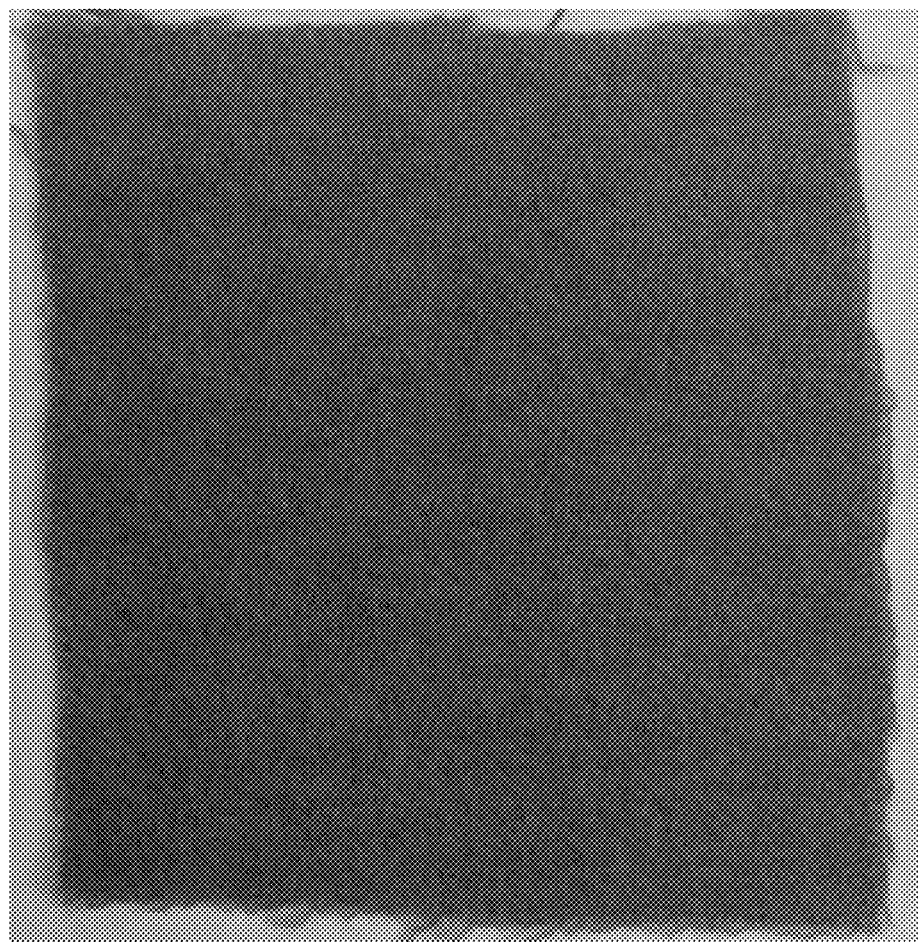
FIG. 13 is a photograph of a control woolen fabric (without any treatment). The fabric is (i) ironed with a crease (folded in the middle, ironed 5 minutes per side); (ii) washed with detergent (300 mL 0.36% Tide for 15 min, rinsed with large amount of water); (iii) dried in an oven (80° C.); and (iv) steam ironed flat (2 min. per side). The fabric is crease is lost.
Figure 14A:
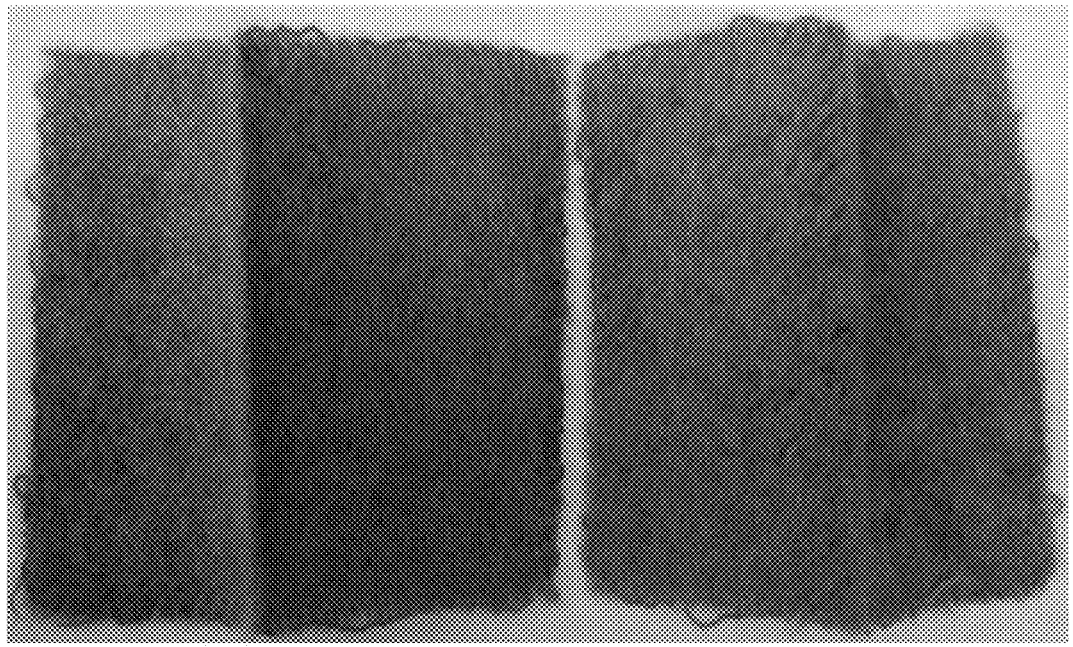
FIGS. 14A-14B are photographs of woolen fabric treated with oxidized sucrose solution. The fabric is ironed with a crease (folded in the middle, ironed 5 minutes per side). The creases in the treated fabric are shown.
Figure 14B:
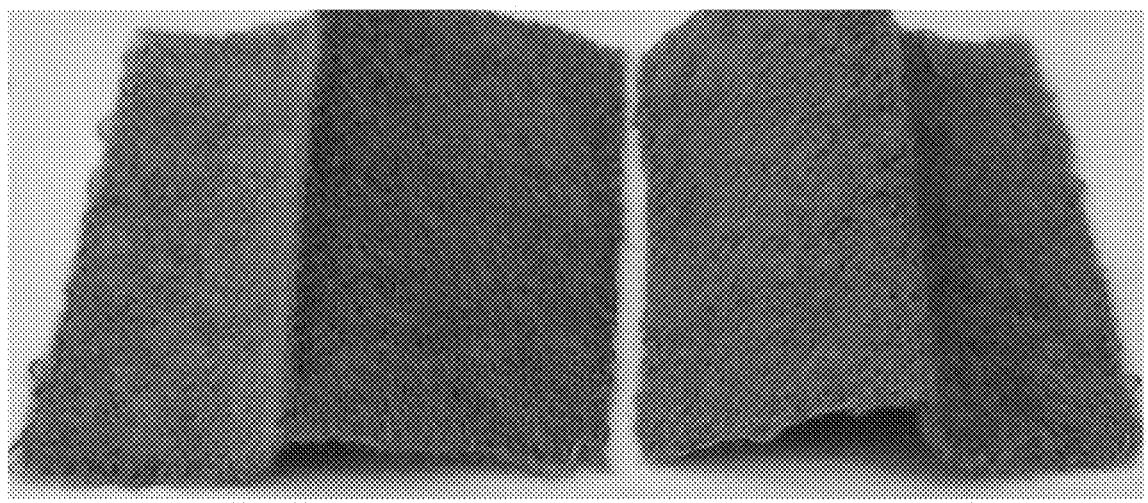
Figure 15A:
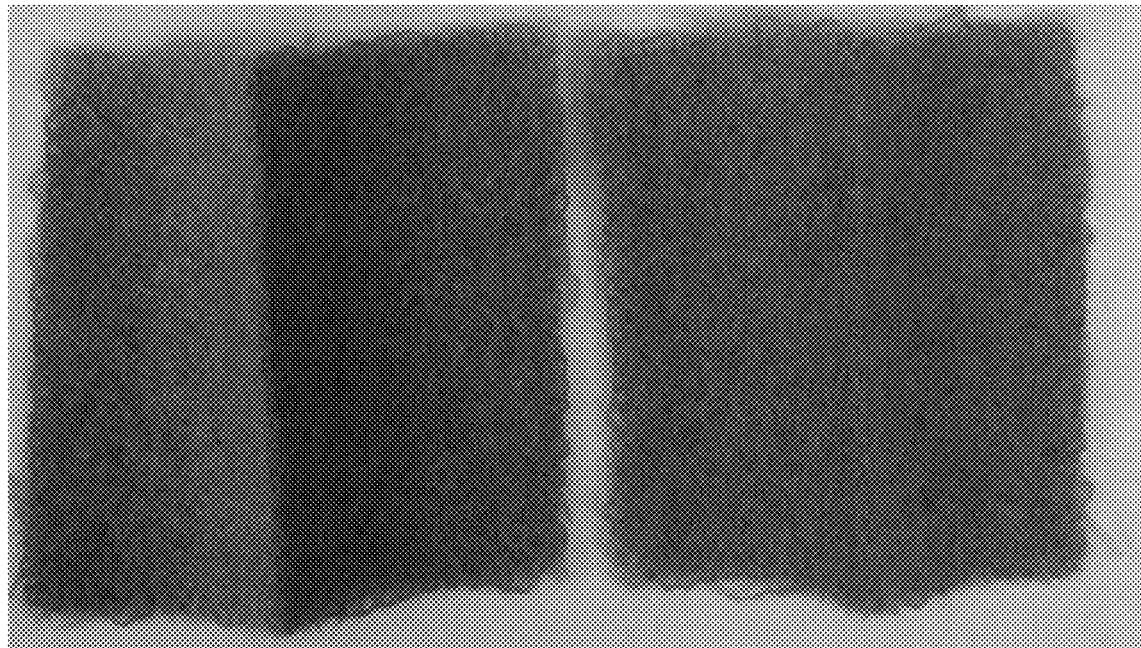
FIGS. 15A-15B are photographs of woolen fabric treated with oxidized sucrose solution. The fabric is (i) ironed with a crease (folded in the middle, ironed 5 minutes per side); (ii) washed with detergent (300 mL 0.36% Tide for 15 min, rinsed with large amount of water); and (iii) unfolded and dried in an oven (80° C.). Two views of the treated fabrics show the retained creases after washing the treated fabric specimens.
Figure 15B:
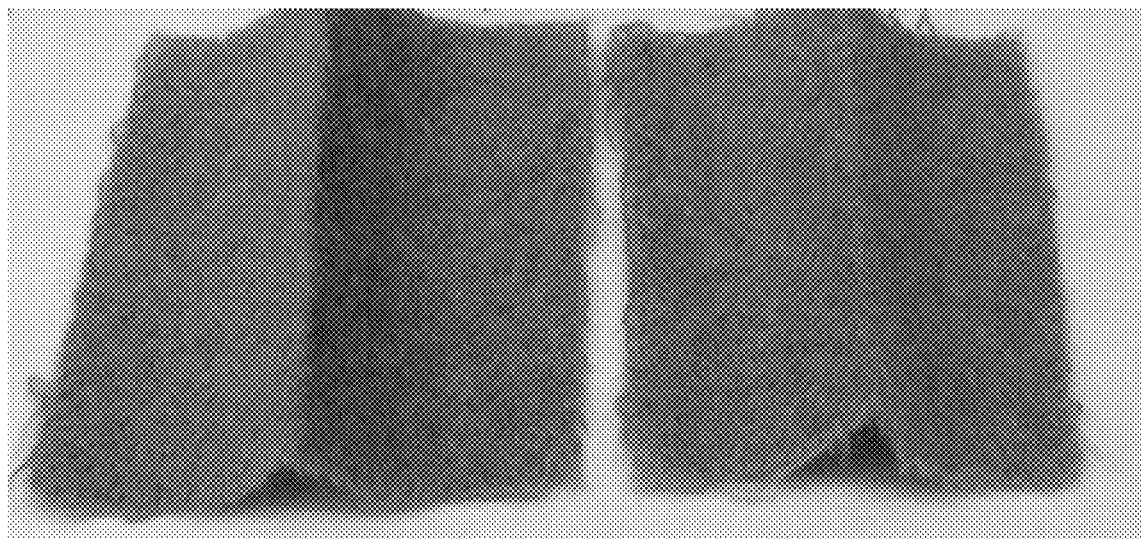
Figure 16:
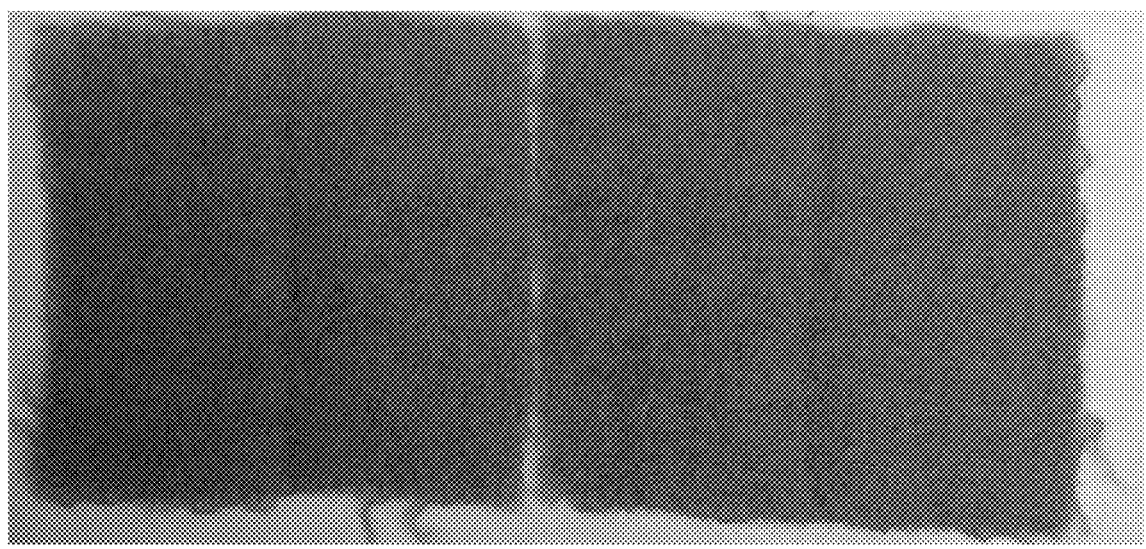
FIG. 16 is a photograph of a woolen fabric treated with oxidized sucrose solution. The fabric is (i) ironed with a crease (folded in the middle, ironed 5 minutes per side); (ii) washed with detergent (300 mL 0.36% Tide for 15 min, rinsed with large amount of water); (iii) unfolded and dried in an oven (80° C.); and (iv) steam ironed flat (2 min. per side). The fabric is shown to retain the creases even after washing and ironing flat.
Figure 17A:
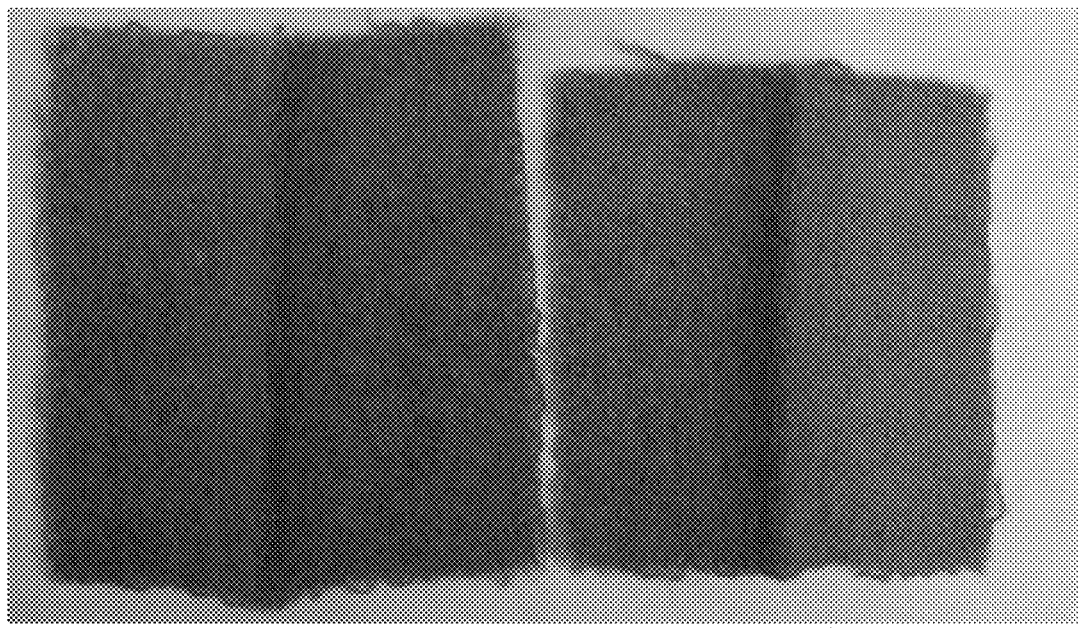
FIGS. 17A-17B are photographs of woolen fabric treated with oxidized sucrose solution. The fabric was oven cured at 120° C. with crease, obtained by placing the folded fabric between two glass plates for 15 min per side. Two views are shown for clarity. The fabric shows excellent crease after placing between flat glass plates at 120° C.
Figure 17B:
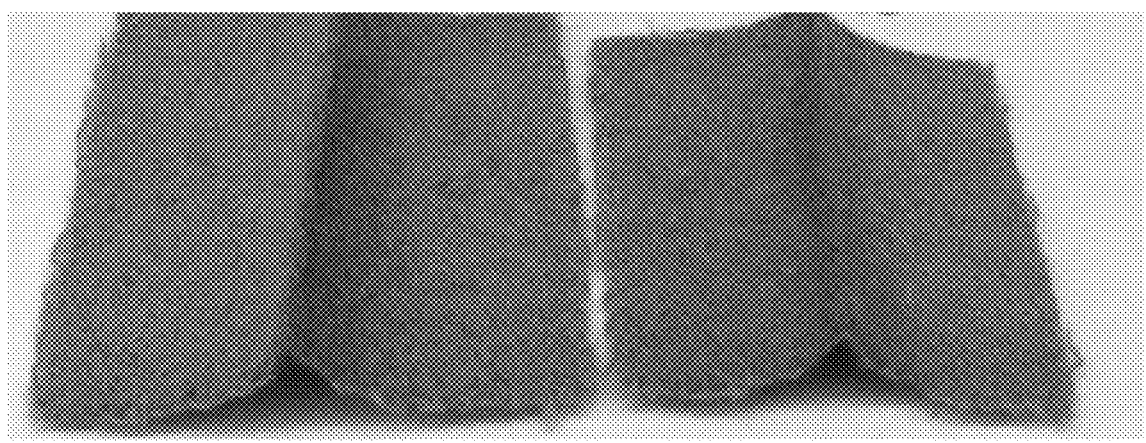
Figure 18A:
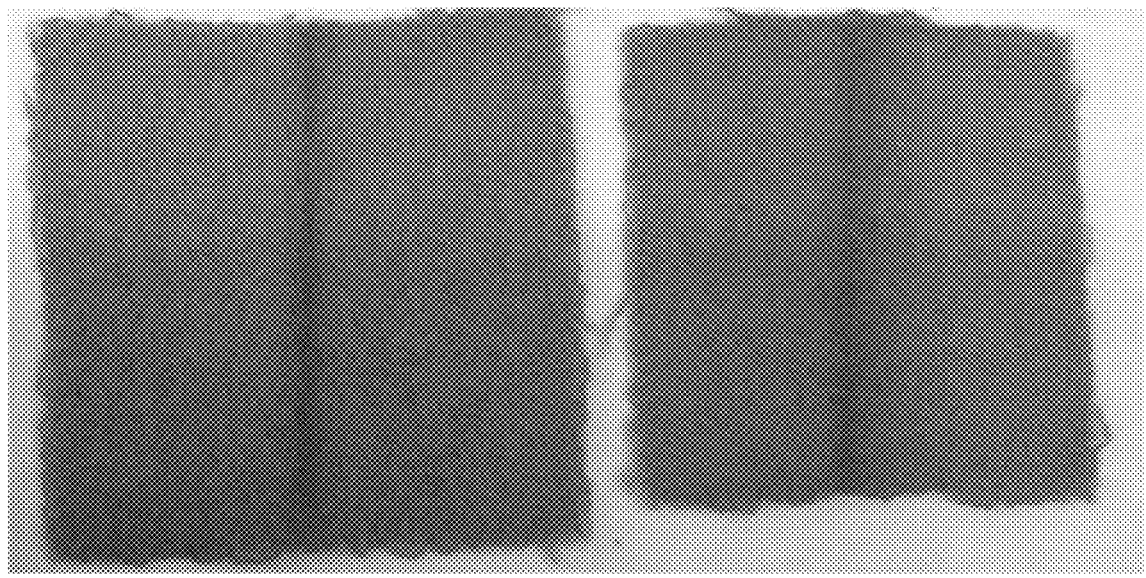
FIGS. 18A-18B are photographs of woolen fabric treated with oxidized sucrose solution. The fabric was (i) oven cured with crease (120° C. for 15 min per side, by placing the folded fabric between two glass plates); (ii) washed with detergent (300 mL 0.36% Tide for 15 min, rinsed with large amount of water); (iii) unfolded and dried in an oven (80° C.). The fabric retained creases even after washing with detergent and drying in an oven.
Figure 18B:
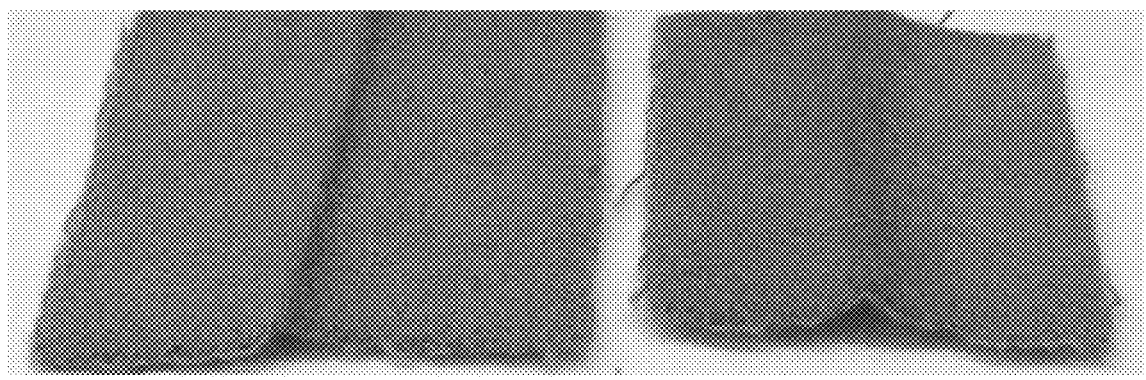
Figure 19:
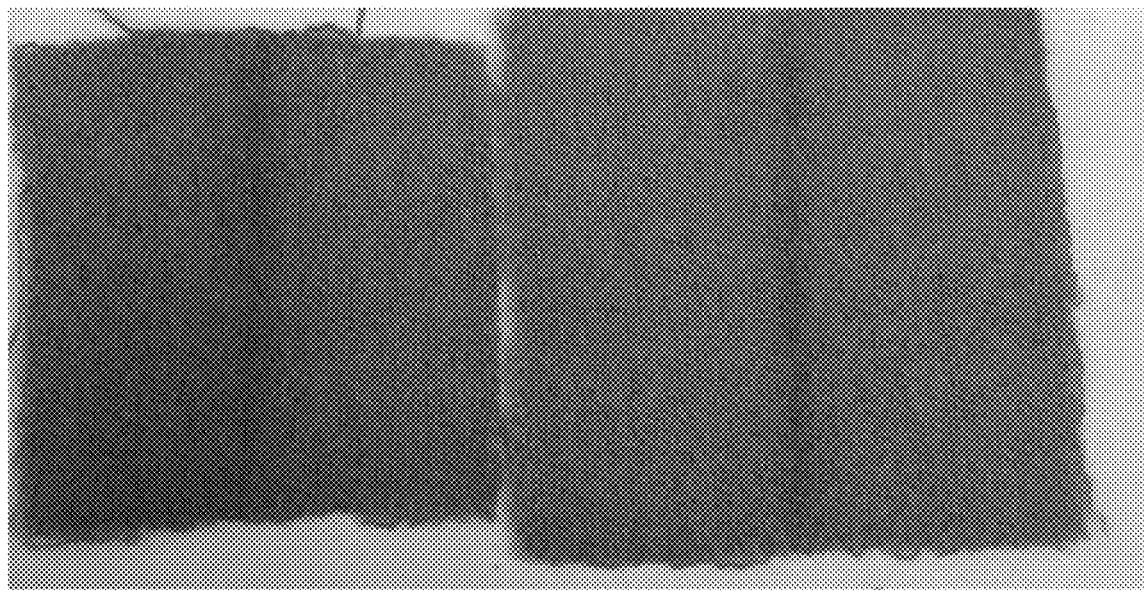
FIG. 19 is a photograph of a woolen fabric treated with oxidized sucrose solution. The fabric was (i) oven cured at 120° C. with crease by placing it in between two glass plates for 15 min per side; (ii) washed with detergent (300 mL 0.36% Tide for 15 min, rinsed with large amount of water); (iii) unfolded and dried in oven (80° C.); and (iv) steam ironed flat (2 min per side). The fabric retained creases even after washing in water, drying in an oven and ironing flat.
Figure 20:
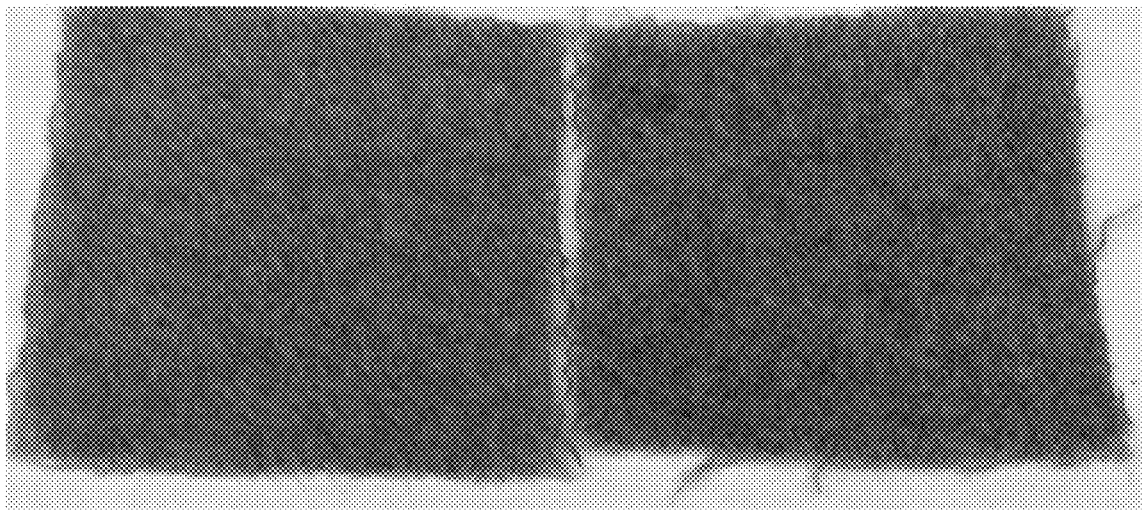
FIG. 20 is a photograph of a woolen fabric treated with oxidized sucrose solution. The fabric was ironed flat (ironed 5 min per side). This illustrates that the treated fabric can be ironed flat (initially).
Figure 21A:
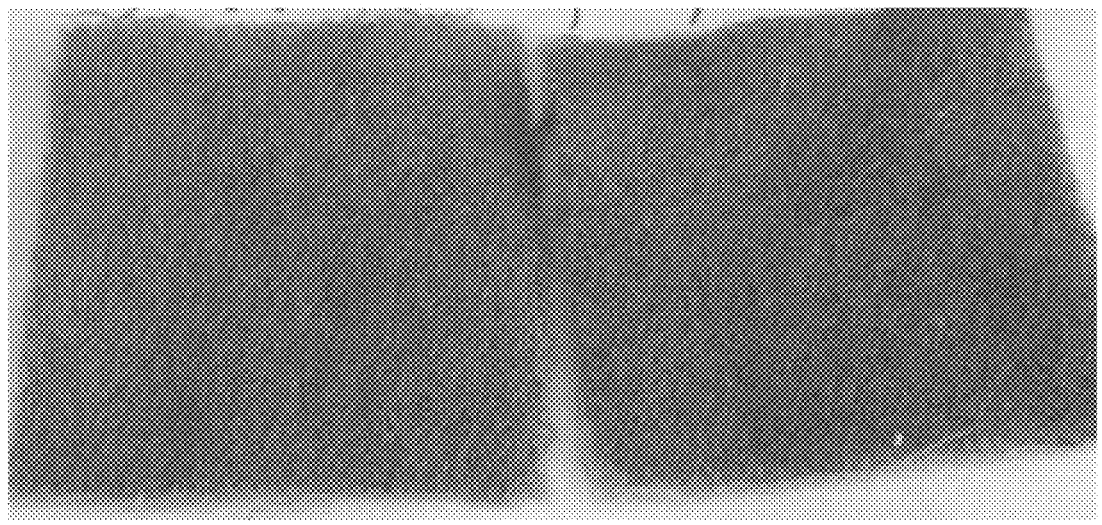
FIGS. 21A-21B are photographs of woolen fabric treated with oxidized sucrose solution and non-treated woolen fabric. The fabric was (i) ironed flat; (ii) washed with detergent (300 mL 0.36% Tide for 15 min, rinsed with large amount of water); and (iii) dried in oven (80° C.).
Figure 21B:
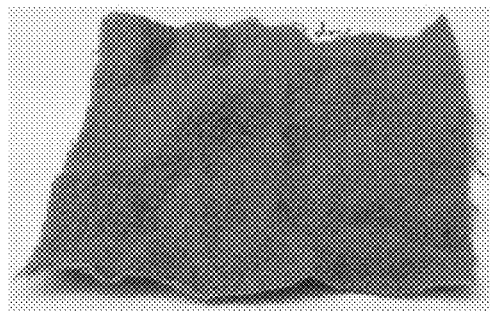

About 12" long 100% virgin Brazilian natural curly human hair was used in this study. The stretched length of the curly hair was 16". It was first washed with Shampoo (Pantene) and water at room temperature and air dried. The prepared sucrose aldehyde solution was then heated to 50° C. and applied to the hair using a brush and ensuring that the solution is applied to all the hair and allowed to stand for 5 minutes. It was then flat ironed using a Remington flat iron for 5 passes and again coated with the sugar aldehyde solution using a brush. After, 15 min, it was flat ironed again for 10 passes and set aside for another 5 minutes before washing it with cold water to remove excess of the sucrose aldehyde on the hair. It was then air dried and flat ironed for 5 passes. FIG. 8 illustrates various results of the process.

While the present invention has been described with reference to the specific embodiments thereof it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present invention. All such modifications are intended to be within the scope of the claims appended hereto.

What is claimed is:

1. A formulation for crosslinking keratin-containing fibers of hair comprising:
   a crosslinking agent comprising an oxidized sugar having at least two aldehyde groups, wherein the sugar is selected from the group consisting of monosaccharides, disaccharides, trisaccharides, and tetrasaccharides,
   wherein the keratin-containing fibers of hair comprise a plurality of protein molecules comprising amine groups, and
   wherein the aldehyde groups of the oxidized sugar are effective to react with the amine groups of the protein molecules contained in the keratin-containing fibers to yield a population of crosslinked keratin-containing fibers.

2. The formulation of claim 1, further comprising one or more of a preservative, a stabilizer, a filler, a coloring agent, a scent agent, a cosmetically acceptable carrier, an emulsifier, or mixtures thereof.

3. The formulation of claim 1, wherein the formulation is in a form of a paste.

4. The formulation of claim 1, wherein the formulation is in a form of an aqueous solution.

5. The formulation of claim 4, wherein the aqueous solution comprises at least 40 weight percent of water.

6. The formulation of claim 4, wherein the aqueous solution comprises between about 1-60 weight percent of the oxidized sugar.

7. The formulation of claim 1, wherein the formulation has a concentration of aldehyde groups of between about 20 and about 32 weight percent.

8. The formulation of claim 7, wherein the formulation is sufficiently free of an oxidizing agent so that the concentration of aldehyde groups is maintained prior to reaction of the aldehyde groups with the amine groups of the protein molecules contained in non-crosslinked keratin-containing fibers.

9. The formulation of claim 1, wherein the crosslinking agent comprises a plurality of oxidized sugars having at least two aldehyde groups.

10. The formulation of claim 1, wherein the sugar is selected from the group consisting of galactose, sucrose, maltose, lactose, raffinose, and stachyose.

11. The formulation of claim 1, wherein the formulation is configured to maintain a three dimensional structure of the keratin-containing fibers of hair via a reaction of the aldehyde groups with the amine groups of the protein molecules.

12. The formulation of claim 11, wherein the three dimensional structure of the keratin-containing fibers of hair is selected from the group consisting of a creased fabric, a non-creased fabric, a pleated fabric, straight hair, wavy hair, curly hair, and combinations of the straight, wavy, or curly hair.

13. The formulation of claim 1, wherein the hair is selected from the group consisting of straight hair, wavy hair, and curly hair, or combinations thereof.

14. The formulation of claim 1, wherein the hair comprises human hair, non-human hair, or a mixture thereof.

15. The formulation of claim 14, wherein the non-human hair comprises animal fibers selected from the group consisting of wool, alpaca, angora, fur, cashmere, mohair, and qiviut.

16. The formulation of claim 14, wherein the animal fibers are from animals selected from the group consisting of sheep, vicuna, alpaca, llama, muskox, goats, bison, camel, yak, horse, chinchilla, and rabbit.

17. The formulation of claim 14, wherein the animal fibers have a form selected from the group consisting of raw fibers, yarns, felts, and woven or knitted fabrics.

18. A population of crosslinked keratin-containing fibers of hair, wherein the crosslinked-keratin-containing fibers of hair are produced according to a process comprising:
    providing a crosslinking agent according to claim 1; and
    infiltrating a plurality of keratin-containing fibers of hair with the crosslinking agent under conditions effective to cause protein molecules contained in the keratin-containing fibers to become crosslinked, thereby yielding a population of crosslinked keratin-containing fibers,
    wherein the protein molecules of the keratin-containing fibers comprise amine groups that react with the at least two aldehyde groups of the oxidized sugar to achieve the crosslinking of the protein molecules to yield the crosslinked keratin-containing fibers of hair.

19. The formulation of claim 1, wherein the sugar is a disaccharide.

20. The formulation of claim 1, wherein the sugar is a trisaccharide.

* * * * *